(12) United States Patent
Sakama et al.

(10) Patent No.: US 7,535,364 B2
(45) Date of Patent: May 19, 2009

(54) ANTENNA APPARATUS

(75) Inventors: Isao Sakama, Hiratsuka (JP); Minoru Ashizawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 199 days.

(21) Appl. No.: 11/299,671

(22) Filed: Dec. 13, 2005

(65) Prior Publication Data

US 2007/0046465 A1    Mar. 1, 2007

(30) Foreign Application Priority Data

Aug. 25, 2005  (JP) ............................. 2005-244375

(51) Int. Cl.
*G08B 13/14* (2006.01)
(52) U.S. Cl. .................. 340/572.7; 340/572.1
(58) Field of Classification Search .............. 340/572.1, 340/572.3, 572.4, 572.7, 572.8, 5.61, 5.66, 340/10.2, 10.3, 572.5; 235/492, 380; 342/44; 343/841
See application file for complete search history.

(56) References Cited

U.S. PATENT DOCUMENTS

| | | | | |
|---|---|---|---|---|
| 3,938,044 | A * | 2/1976 | Lichtblau ................ | 340/572.3 |
| 5,461,386 | A * | 10/1995 | Knebelkamp ............... | 342/44 |
| 5,561,430 | A * | 10/1996 | Knebelkamp ............... | 342/44 |
| 6,172,608 | B1 * | 1/2001 | Cole ...................... | 340/572.1 |
| 6,176,433 | B1 * | 1/2001 | Uesaka et al. ............. | 235/492 |
| 6,326,922 | B1 | 12/2001 | Hegendoerfer | |
| 6,861,993 | B2 * | 3/2005 | Waldner ................... | 343/742 |
| 7,084,769 | B2 * | 8/2006 | Bauer et al. .............. | 340/572.7 |
| 7,126,545 | B2 * | 10/2006 | Nagano et al. ............ | 343/702 |
| 7,227,504 | B2 * | 6/2007 | Deguchi et al. ............ | 343/742 |
| 7,250,867 | B2 * | 7/2007 | Sakama et al. ........... | 340/572.7 |
| 2003/0160730 | A1 | 8/2003 | Alsliety | |
| 2004/0266481 | A1 * | 12/2004 | Patel et al. ............... | 455/558 |
| 2005/0057422 | A1 | 3/2005 | Deguchi | |
| 2005/0192056 | A1 * | 9/2005 | Karaki ..................... | 455/561 |

FOREIGN PATENT DOCUMENTS

JP     2002-183676    6/2002
WO    WO 2004/025554    3/2004

* cited by examiner

*Primary Examiner*—Van T. Trieu
(74) *Attorney, Agent, or Firm*—Antonelli, Terry, Stout & Kraus, LLP.

(57) ABSTRACT

An antenna apparatus which ensures a wide reading area on a reader antenna and a reading operability of information recorded in a small-sized radio frequency IC tag is provided. The apparatus includes an auxiliary antenna of $\lambda/2$ long disposed near to a radiating antenna of $\lambda/2$ long and including plural conductive elements in an array. When the IC tag approaches the auxiliary antenna, a subsidiary tuning circuit is formed between it and an inlet antenna of IC tag, so making tuning complementary to each other. The inlet antenna having an antenna length shorter than the tuning frequency can receive energy from the auxiliary antenna efficiently and is excited integrally with the auxiliary antenna to thereby spread a reading area by apparatus and increase the communication distance.

27 Claims, 20 Drawing Sheets

DISPOSED ON
SAME PLANE

DISPOSED ABOVE

DISPOSED
INTO SEMICIRCLE

DISPOSED
INTO CIRCLE

DISPOSED ON PERPENDICULAR PLANE

DISPOSED ON PARALLEL PLANE

DISPOSED INTO SEMICIRCLE

DISPOSED OBLIQUELY OVER ALL AREA

DISPOSED OBLIQUELY OVER HALF AREA

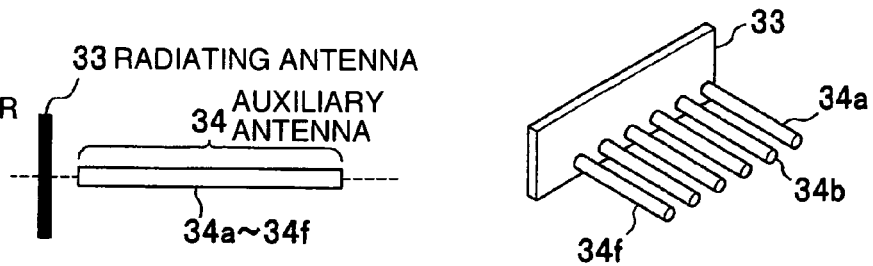
FIG. 8A DISPOSED ON PERPENDICULAR PLANE
33 RADIATING ANTENNA
34 AUXILIARY ANTENNA
34a~34f
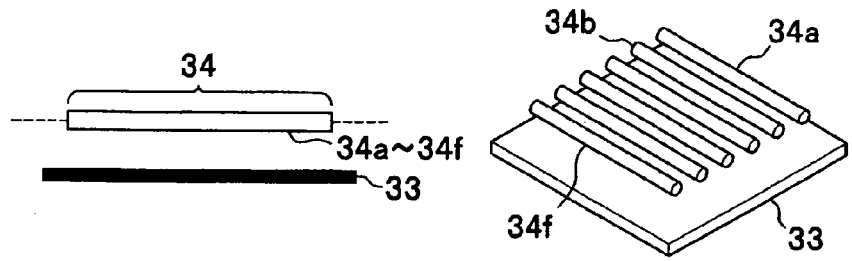
FIG. 8B DISPOSED ON PARALLEL PLANE
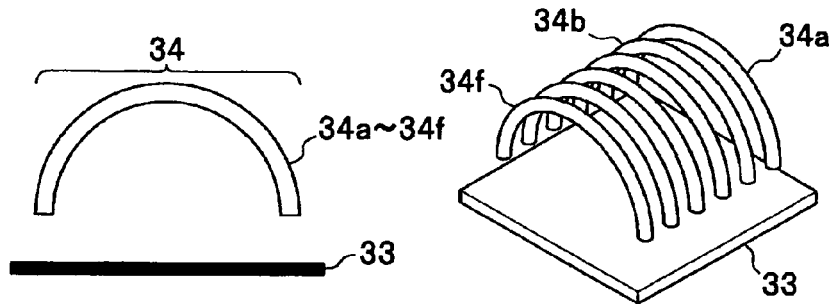
FIG. 8C DISPOSED INTO SEMICIRCLE
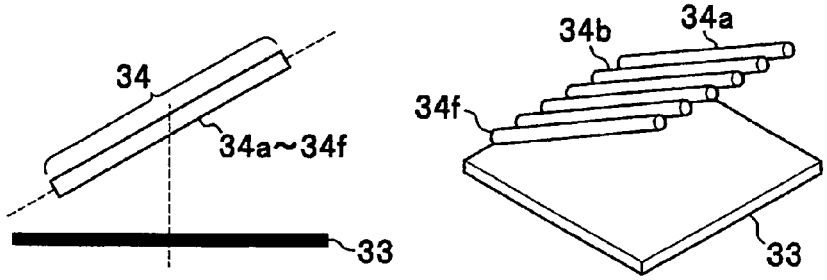
FIG. 8D DISPOSED OBLIQUELY OVER ALL AREA
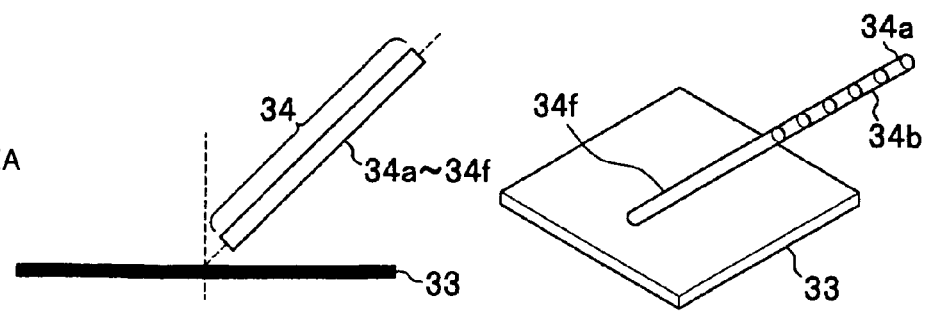
FIG. 8E DISPOSED OBLIQUELY OVER HALF AREA

DISPOSED ON SAME PLANE

DISPOSED ABOVE

DISPOSED INTO A SEMICIRCLE

DISPOSED INTO CIRCLE

DISPOSED ON VERTICAL PLANE
(PERSPECTIVE VIEW)

DISPOSED ON VERTICAL PLANE

READABLE POSITION

6a RADIO FREQUENCY IC TAG
23c CONDUCTIVE ELEMENT
23b CONDUCTIVE ELEMENT
23a CONDUCTIVE ELEMENT

UNREADABLE POSITION 23v  23w  23x

DISPOSED ON PERPENDICULAR PLANE

DISPOSED OBLIQUELY OVER HALF AREA

DISPOSED OBLIQUELY OVER ALL AREA

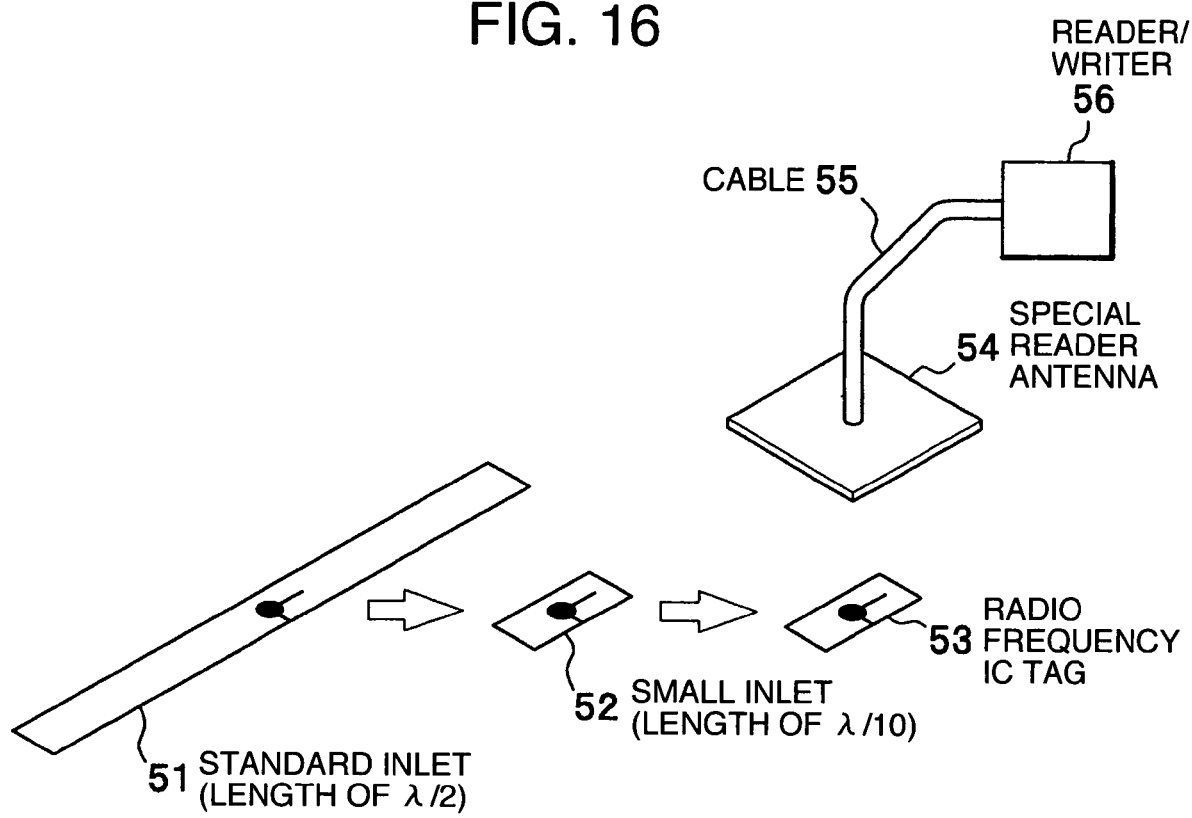

PERSPECTIVE VIEW

TOP VIEW

SIDE VIEW

EXTERNAL APPEARANCE

READING AREA

PERSPECTIVE VIEW

TOP VIEW

SIDE VIEW

PERSPECTIVE VIEW

READING AREA

SMALL READER APPARATUS

CONDUCTIVE ELEMENT

ANTENNA APPARATUS

INCORPORATION BY REFERENCE

The present application claims priority from Japanese application JP2005-244375 filed on Aug. 25, 2005, the content of which is hereby incorporated by reference into this application.

BACKGROUND OF THE INVENTION

The present invention relates to an antenna apparatus for making communication with a radio frequency IC tag (RF ID tag) to read information therein and serving as a reader/writer.

Recently, radio frequency IC tags are widely used for information management or distribution management of articles and structures. Such radio frequency (RF) IC tags each include a small IC chip in which information is recorded and a transmitting antenna for transmitting the information recorded in the IC chip by radio. The small IC chip having, for example, a thickness of 0.4 mm, a depth of 0.4 mm and a height of 0.1 mm is utilized. A reader/writer is merely held to the radio frequency IC tag to thereby make it possible to get information concerning attributes of individual articles or structures without contact. It is desirable that the radio frequency IC tag is as small as possible in order to stick the radio frequency IC tag on an article or embed the radio frequency IC tag in a structure. For example, when the radio frequency IC tag is stuck on the head of a bolt, the radio frequency IC tag is desirably smaller than or equal to 10 mm in size.

In order to make the radio frequency IC tag small, it is necessary to make small a transmitting antenna for transmitting information. In this connection, for example, when the length of the transmitting antenna of the radio frequency IC tag is made smaller than or equal to $\lambda/4$ where $\lambda$ is a wavelength of radio wave transmitted by the radio frequency IC tag, a general reader antenna such as a dipole antenna and a patch antenna used generally has insufficient sensitivity due to reduction of antenna efficiency and it is necessary to use a reader antenna of a special shape (special reader antenna).

FIG. 16 shows an image of an antenna of a radio frequency IC tag that is cut for use.

A standard inlet 51 (1.5 mm wide and 51 mm long) having the antenna length of $\lambda/4$ is cut at both ends thereof to form a small inlet 52 (1.5 mm wide and 10 mm long) having the antenna length of $\lambda/10$, for example. When this small inlet is used as a small radio frequency IC tag 53, communication is made using a special reader antenna 54 as shown in FIG. 16 due to reduction of antenna efficiency. In this case, it is necessary to exactly align the radio frequency IC tag 53 with the special reader antenna 54 connected through a cable 55 to a reader/writer 56 and it is not easy to handle. Further, such a special reader antenna is usually designed in accordance with the size and the shape of the radio frequency IC tag and accordingly it has no generalization.

Heretofore, there is known, for example, a special reader antenna including a resonator composed of a capacitor and a coil disposed at the tip of a pen-type reader (for example, JP-A-2002-183676 (paragraphs 0005-0008)).

SUMMARY OF THE INVENTION

However, the special reader antenna disclosed in JP-A-2002-183676 is required to cause the tip of the pen-type reader to approach just above an IC chip included in a transponder.

Accordingly, the present invention is made in view of the above problems and it is a main object of the present invention to provide an antenna apparatus which can ensure a wide reading area over a reader antenna and can be used without reduction of reading operability even when an antenna for a radio frequency IC tag is made small. Further, it is another object of the present invention is to provide an antenna apparatus which can extend the application range of the radio frequency IC tag.

In order to achieve the above objects, according to the present invention, the antenna apparatus for receiving radio wave generated by a radio frequency IC tag to read information therein and serving as a reader/writer, comprises a radiating antenna having a length of $\lambda/2$ and which generates an electric field by electric power supplied to a feeding point thereof and an auxiliary antenna having a length of $\lambda/2$ and which resonates by the electric field generated by the radiating antenna to generate an induced current.

Further, in the above structure of the present invention, the radiating antenna is a dipole antenna and the auxiliary antenna includes a single or plurality of conductive elements arranged in an array and disposed in parallel with the radiating antenna. The radiating antenna and the conductive elements are disposed at spaces shorter than or equal to the width or the length of the radio frequency IC tag. For example, the plurality of conductive elements are disposed at spaces shorter than or equal to the length or the width of the radio frequency IC tag.

According to the antenna apparatus of the present invention, disposition of the auxiliary antenna in the vicinity of the radiating antenna can increase the area that radio wave generated by the radio frequency IC tag can be received and can receive radio wave generated by the radio frequency IC tag within a wide area with high sensitivity. Since exact alignment with the radio frequency IC tag is not required, handling is improved. The antenna apparatus can receive information generated by the radio frequency IC tag having any antenna shape and accordingly the antenna apparatus keeps generalization. Particularly, when the auxiliary antenna is formed of a plurality of conductive elements and the conductive elements are arranged in an array at spaces shorter than or equal to the length or width of the radio frequency IC tag, the reading area of the antenna apparatus can be further increased and can receive radio wave generated by the radio frequency IC tag exactly. Operability when information is read from the radio frequency IC tag is more improved.

Other objects, features and advantages of the invention will become apparent from the following description of the embodiments of the invention taken in conjunction with the accompanying drawings.

BRIEF DESCRIPTION OF THE DRAWINGS

FIGS. 8A to 8E are diagrams illustrating arrangements of conductive elements and reading areas of the antenna apparatuses;

FIG. 16 is a diagram showing an image of an antenna of a radio frequency IC tag when it is cut for use;

DETAILED DESCRIPTION OF THE EMBODIMENTS

The antenna apparatus according to the present invention includes an auxiliary antenna disposed in parallel with a radiating antenna connected to a reader/writer in the vicinity of the radiating antenna. The radiating antenna can be structured in the same manner as a conventional general reader antenna. For example, when the wavelength of radio wave radiated from the radio frequency IC tag is $\lambda$, the length of the radiating antenna is set to $\lambda/2$. The auxiliary antenna is disposed opposite to the radiating antenna and its length is set to $\lambda/2$ similarly. In this manner, the provision of the auxiliary antenna in opposing relation to the radiating antenna can improve the antenna efficiency and spread the reading area. Accordingly, even the small radio frequency IC tag having the short antenna length can receive radio wave without making exact alignment or positioning, so that the reader/writer can read information. Since the auxiliary antenna can be structured by a single conductive element or a plurality of conductive elements, the number of conductive elements can be increased to thereby spread the reading area if necessary. Embodiments of the present invention are now described with reference to the accompanying drawings.

First Embodiment

Figure 1:
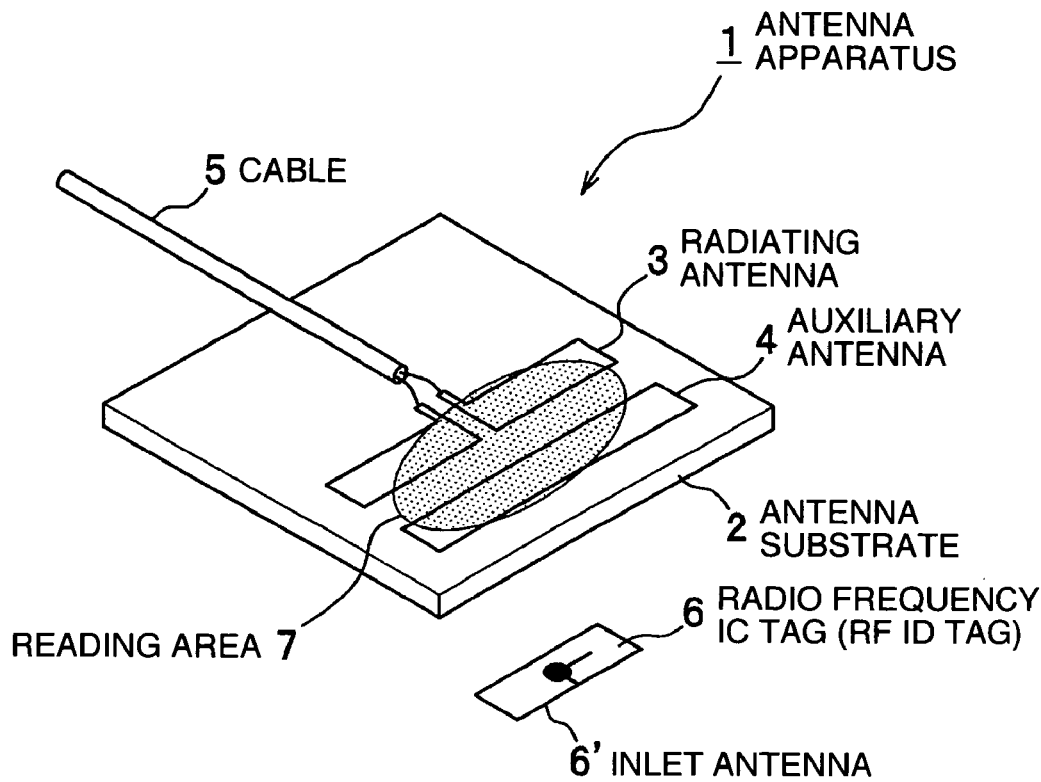
FIG. 1 is a diagram illustrating structure of an antenna apparatus according to a first embodiment of the present invention.

FIG. 1 illustrates the structure of an antenna apparatus according to the first embodiment of the present invention.

As shown in FIG. 1, a radiating antenna 3 having the length of $\lambda/2$ is disposed on the surface of an antenna substrate 2 made of resin or ceramic. The radiating antenna 3 is a dipole antenna and is connected to a reader/writer not shown through a cable 5. An auxiliary antenna 4 having the length of $\lambda/2$ is disposed in parallel with the radiating antenna 3 in the vicinity thereof.

As described above, the antenna apparatus 1 includes the auxiliary antenna 4 disposed in the vicinity of the radiating antenna 3 and accordingly when a radio frequency IC tag 6 approaches the auxiliary antenna 4 as shown in FIG. 1, a subsidiary tuning circuit is formed between the auxiliary antenna 4 and an inlet antenna (transmitting antenna) 6' of the radio frequency IC tag 6. Therefore, two antennas of the auxiliary antenna 4 and the inlet antenna 6' make mutually complementary tuning and accordingly even when the inlet antenna 6' has an antenna length (e.g. $\lambda/10$) shorter than a tuning frequency, the inlet antenna 6' can receive energy from the auxiliary antenna 4 efficiently and can be excited in the state that the inlet antenna 6' and the auxiliary antenna 4 are integrated with each other.

According to the operation as described above, the reading range of the antenna apparatus 1 can be spread as the reading area 7 formed between the radiating antenna 3 and the auxiliary antenna 4 as shown in FIG. 1. Further, the improved antenna efficiency makes it possible to make communication even in the incommunicable state occurred so far. Accordingly, even if the radio frequency IC tag 6 has the antenna length shorter than $\lambda/2$, for example, the antenna apparatus can receive radio wave from the radio frequency IC tag 6, so that the reader/writer to be connected to the antenna apparatus can read information from the radio frequency IC tag. Since exact alignment with or positioning of the radio frequency IC tag 6 in the prior art is not required, the reading operability of the radio frequency IC tag 6 can be improved.

The auxiliary antenna 4 may be structured by a single conductive element as shown in FIG. 1 or may be structured by a plurality of conductive elements arranged in an array as described later. When the auxiliary antenna 4 is structured by the plurality of conductive elements arranged in the array, mutually complementary tuning is made even between the conductive elements of the auxiliary antenna and the inlet antenna 6' and accordingly the reading area can be further spread.

As described above, the radiating antenna 3 has the same structure as the conventional general reader antenna and accordingly the antenna apparatus 1 of the embodiment can be realized by adding the auxiliary antenna 4 to the general reader antenna. In other words, the conventional general reader antenna can be improved to the antenna apparatus 1 of the embodiment easily.

Second Embodiment

In the second embodiment of the present invention, an antenna apparatus including an auxiliary antenna composed of a plurality of conductive elements is described.

Figure 2:
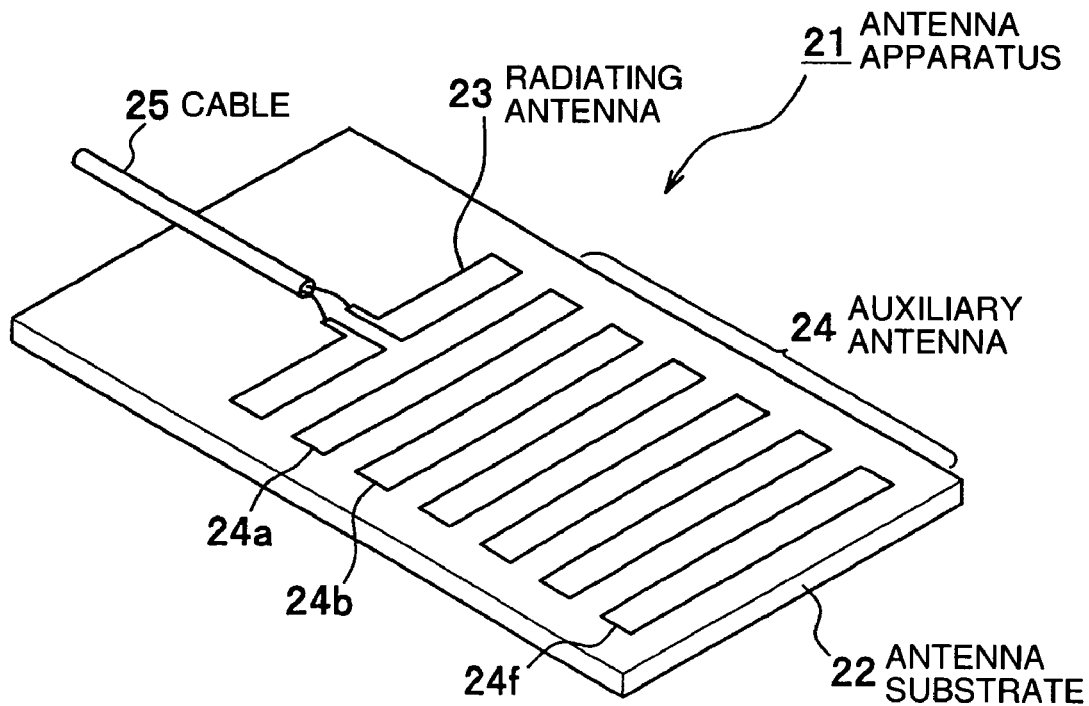
FIG. 2 is a diagram illustrating structure of an antenna apparatus according to a second embodiment of the present invention.

FIG. 2 illustrates the structure of the antenna apparatus according to the second embodiment.

As shown in FIG. 2, an antenna apparatus 21 includes a radiating antenna 23 having the length of λ/2 and disposed on the surface of an antenna substrate 22 and six conductive elements 24a, 24b, . . . , 24f disposed in the vicinity of the radiating antenna 23 and arranged in an array to serve as an auxiliary antenna 24. For example, when an operation frequency of the radio frequency IC tag is 2.45 GHz and the antenna length of the radio frequency IC tag is 10 mm, the space between the radiating antenna 23 and the conductive element 24a of the antenna apparatus 21 is set to 2.5 mm (0.02λ) and the spaces between the respective conductive elements 24a to 24f is set to 9 mm (0.07λ). Each of the conductive elements has the width of 2.5 mm and the length of 50 mm. The space between the radiating antenna 23 and the conductive element 24a is varied in accordance with the mutual relation of the spaces between the respective conductive elements constituting the conductor array. Such dense arrangement of the conductive elements 24a to 24f (that is, the auxiliary antenna 24) resonates the conductive elements 24a to 24f in response to an electric field generated from the radiating antenna 23 to generate induced currents in the conductive elements 24a to 24f. At this time, it is not necessary to control the phase of the induced currents generated in the conductive elements 24a to 24f.

The spaces between the radiating antenna 23 and the respective conductive elements 24a, 24b, . . . , 24f may be set so that the radio frequency IC tag overlaps with the conductive elements 24a, 24b, . . . , 24f when the radio frequency IC tag is disposed or set orthogonally or in parallel to the conductive elements 24a to 24f as described later.

The radio frequency IC tag sometimes has the antenna length of 24 mm. When this radio frequency IC tag is disposed or set orthogonally to conductive elements, the antenna length of 24 mm (0.2λ) of the radio frequency IC tag is equal to the maximum space between the conductive elements in the general reader antenna. On the other hand, when the radio frequency IC tag is set in parallel to the conductive elements, the antenna width of 1.5 mm (0.01λ) in the radio frequency IC tag is equal to the minimum space between the conductive elements of the general reader antenna.

Further, the space between the radiating antenna 23 and the adjacent conductive element 24a and the spaces between the respective conductive elements 24a, 24b, . . . , 24f can be set to be smaller than or equal to 0.1λ and in this case the same effects can be attained.

Arrangements of the conductive elements and the reading areas of the antenna apparatus 21 are now described.

FIGS. 3A to 3E are diagrams illustrating arrangements of the conductive elements and the reading areas of the antenna apparatus.

Figure 3A:
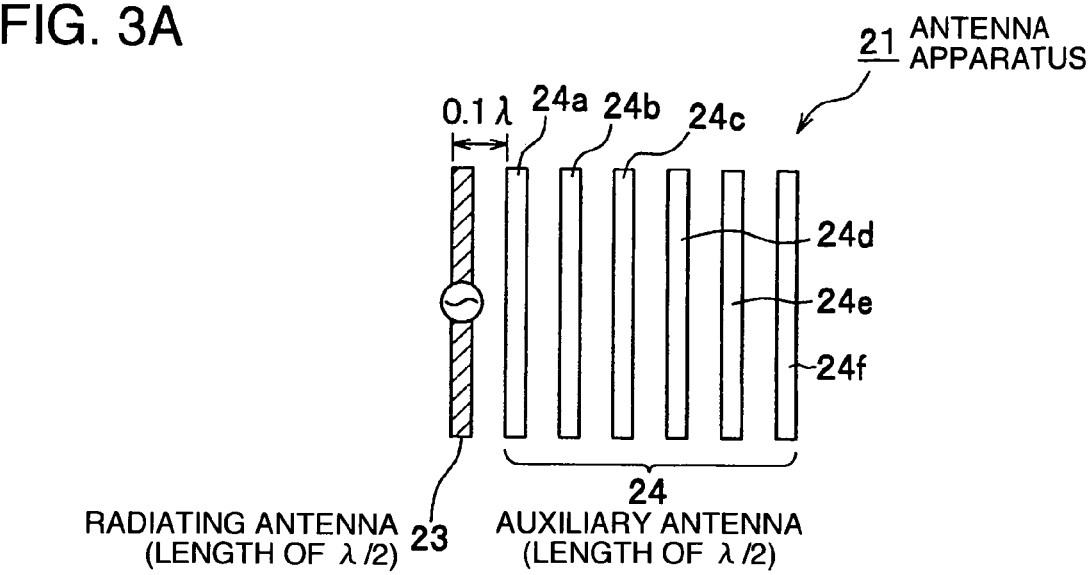
FIGS. 3A to 3E are diagrams illustrating arrangements of conductive elements and reading areas of the antenna apparatus.
Figure 3B:
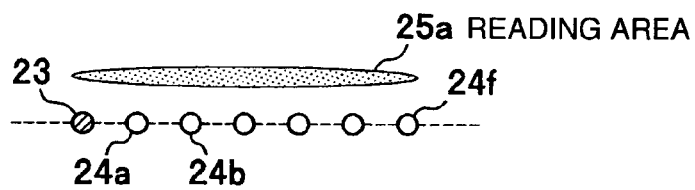

As shown in FIG. 3A, when the radiating antenna 23 and the conductive elements 24a to 24f constituting the auxiliary antenna 24 are disposed on the same plane, the reading area 25a in the radiation direction of radio wave is formed above the plane containing the radiating antenna 23 and the conductive elements 24a, 24b, . . . , 24f and reaches to the wide area surrounding the radiating antenna 23 and the conductive element 24f as shown in FIG. 3B. In FIG. 3B, the reading area 25a is formed above the radiating antenna 23 and the conductive elements 24a, 24b, . . . , 24f, although the reading area is also formed below the radiating antenna 23 and the conductive elements 24a, 24b, . . . , 24f.

Figure 3C:
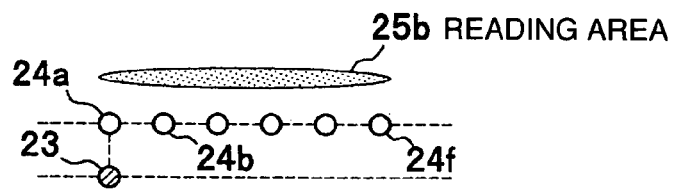

Further, as shown in FIG. 3C, when the conductive elements 24a, 24b, . . . , 24f are disposed on the same plane positioned above the radiating antenna 23, the reading area 25b in the radiation direction of radio wave is formed above the plane constituted by the conductive elements 24a, 24b, . . . , 24f and accordingly the reading area 25b is slightly smaller than the reading area 25a shown in FIG. 3B.

Figure 3D:
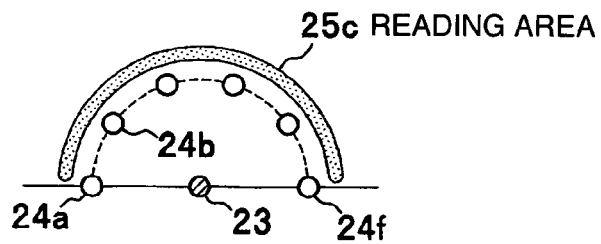

As shown in FIG. 3D, when the conductive elements 24a, 24b, . . . , 24f are disposed into a semicircle about the radiating antenna 23, the reading area 25c in the radiation direction of radio wave is formed above the circumference of the semicircle formed by the conductive elements 24a, 24b, . . . , 24f.

Figure 3E:
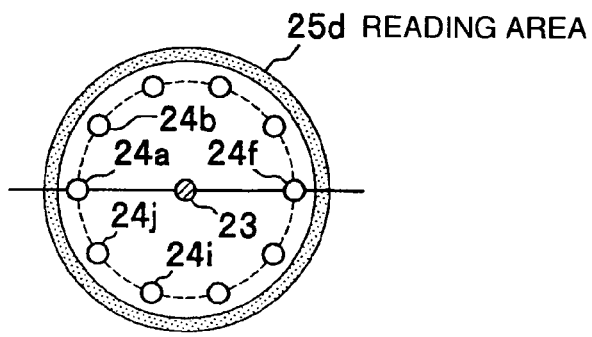

Further, as shown in FIG. 3E, when the conductive elements 24a, 24b, . . . , 24j are disposed into a circle about the radiating antenna 23, the reading area 25d in the radiation direction of radio wave is formed above the circumference of the circle formed by the conductive elements 24a, 24b, . . . , 24j. By forming the reading area into the semicircle or circle, the antenna apparatus can read information recorded in the radio frequency IC tag stuck on a special object easily.

Accordingly, by using the antenna apparatus 21, even the radio frequency IC tag having the short antenna length does not require exact alignment or positioning and attains more improved reading operability of information. Further, since the arrangement of the plurality of conductive elements can be varied if necessary, the antenna apparatus can read information recorded in the radio frequency IC tags stuck at random on objects having various shapes such as foodstuffs, medicines, structures and tickets exactly and easily.

Next, the difference between the antenna apparatus 21 and the Yagi antenna is described.

Figure 4:
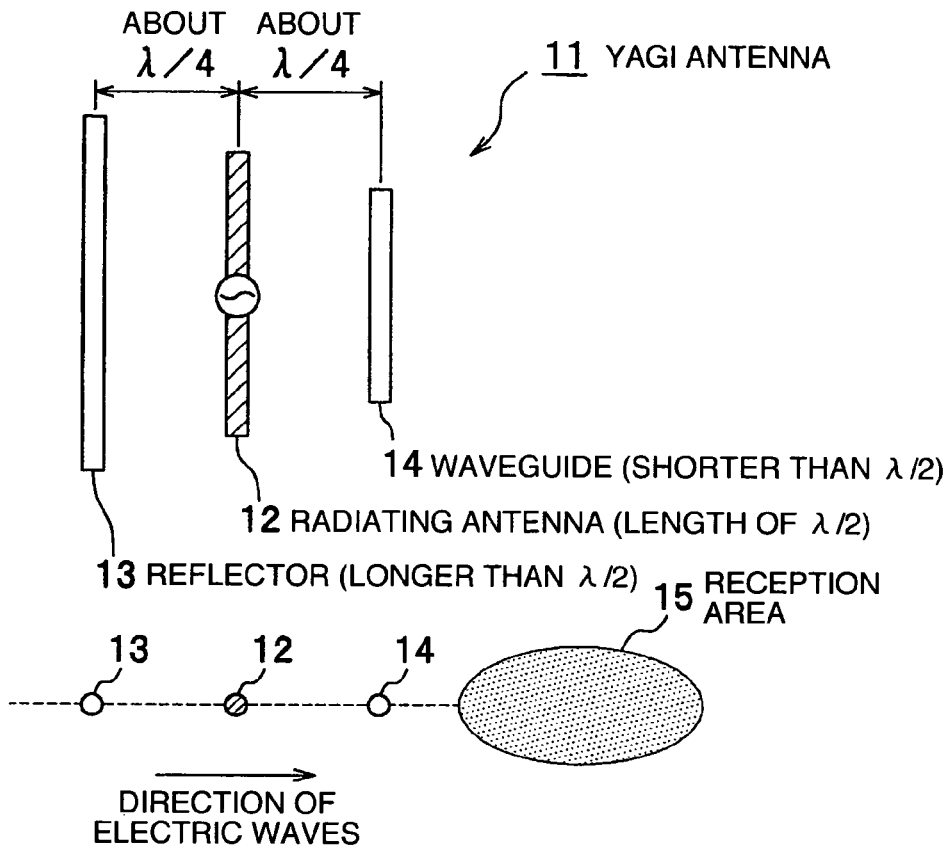
FIG. 4 is a diagram illustrating structure of a general Yagi antenna.

FIG. 4 is a diagram illustrating structure of a general Yagi antenna.

The Yagi antenna 11 widely used in reception for a television includes a radiator 12 constituting a dipole antenna having the length of λ/2, a reflector 13 disposed behind the radiator 12 with the space of about λ/4 therebetween and a waveguide 14 disposed before the radiator 12 with the space of about λ/4 therebetween, and the radiator 12, the reflector 13 and the waveguide 14 are disposed on the plane. The length of the reflector 13 is longer than λ/2 and the length of the waveguide 14 is shorter than λ/2. The reflector 13 and the waveguide 14 of the Yagi antenna 11 are disposed at a position (that is, position spaced by λ/4 from the radiator 12) where an electric field generated by the radiator 12 is in phase with induced currents generated in the reflector 13 and the waveguide 14.

More particularly, since the adjacent antenna elements are required to be spaced by λ/4 therebetween in order to set the phase difference between the adjacent antenna elements to be π/2, the reflector 13, the radiator 12 and the waveguide 14 are disposed at intervals of λ/4 in order of this description. In such structure, radio wave radiated by the radiator 12 and reflected by the reflector 13 goes from the reflector 13 toward the waveguide 14. Accordingly, the reception area 15 of radio wave by the Yagi antenna 11 is formed in front of the plane passing through the reflector 13, the radiator 12 and the waveguide 14 (that is, in front of the waveguide 14) as shown in FIG. 4.

In contrast, since the antenna apparatus 21 is operated on the basis of the principle of mutually complementary tuning between two antennas of the auxiliary antenna 24 and the inlet antenna of the radio frequency IC tag, the operation principle of the antenna apparatus 21 is different from that of the Yagi antenna. Accordingly, the Yagi antenna is required to set the distances between the radiator 12 and the reflector 13 and between the radiator 12 and the waveguide 14 to λ/4, although the antenna apparatus 21 can set the positions of the conductive elements without such restriction.

Third Embodiment

In the third embodiment of the present invention, an antenna apparatus including a radiating antenna constituted by a microstrip antenna and conductive elements disposed in parallel with the plane of polarization is described.

Figure 5:
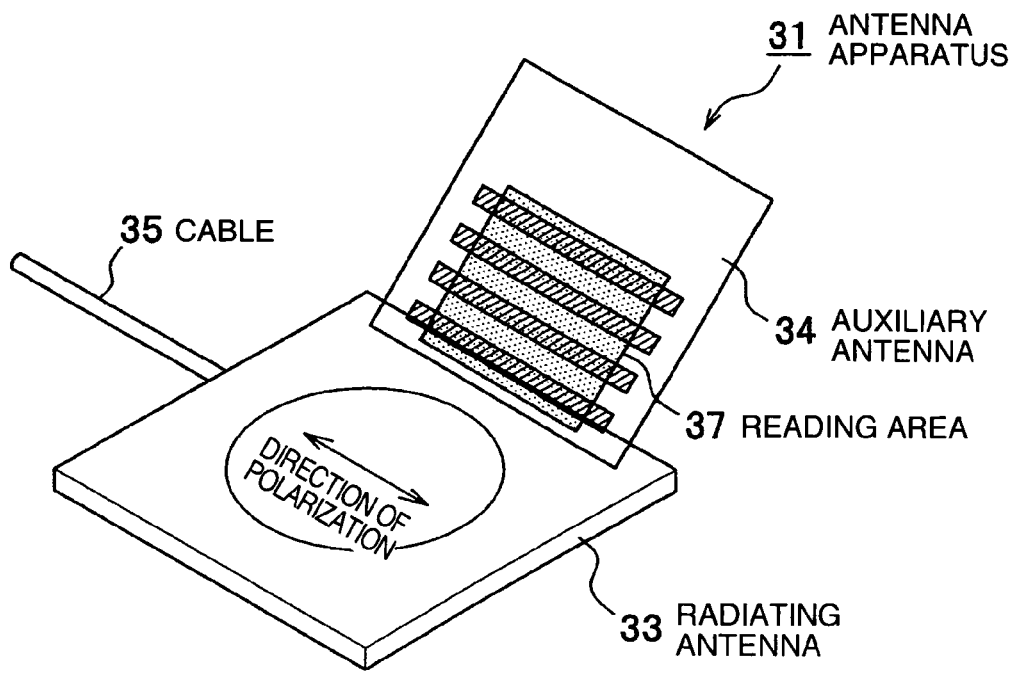
FIG. 5 is a diagram illustrating a radiating antenna constituted by a microstrip antenna and conductive elements disposed in parallel with the plane of polarization of the radiating antenna.

FIG. 5 is a diagram illustrating a radiating antenna constituted by a microstrip antenna and conductive elements disposed in parallel with the plane of polarization.

As shown in FIG. 5, the antenna apparatus 31 basically includes a radiating antenna 33 connected through a cable 35 to a reader/writer not shown and constituted by a microstrip antenna having a radiating electrode formed on the obverse and a ground electrode formed on the reverse thereof and an auxiliary antenna 34 having a plurality of conductive elements arranged in an array in parallel with the direction of polarization. A variety of methods of arranging the plurality of conductive elements are considered.

FIGS. 6A to 6E are diagrams illustrating a variety of arrangements of the plurality of conductive elements.

Figure 6A:
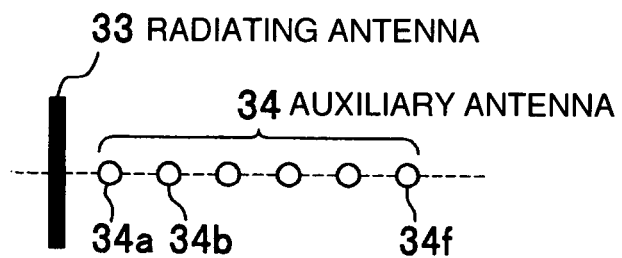
FIGS. 6A to 6E are diagrams illustrating a variety of arrangements of a plurality of conductive elements.
Figure 6B:
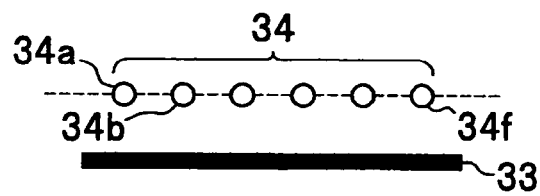

In a first variation, as shown in FIG. 6A, conductive elements 34a, 34b, . . . , 34f constituting the auxiliary antenna 34 are disposed on the plane perpendicular to the radiating antenna 33. Further, in a second variation, as shown in FIG. 6B, the conductive elements 34a, 34b, . . . , 34f constituting the auxiliary antenna 34 are disposed on a plane parallel with the radiating antenna 33. In a third variation, as shown in FIG. 6C, the conductive elements 34a, 34b, . . . , 34f constituting the auxiliary antenna 34 are disposed into a semicircle above the radiating antenna 33.

Figure 6C:
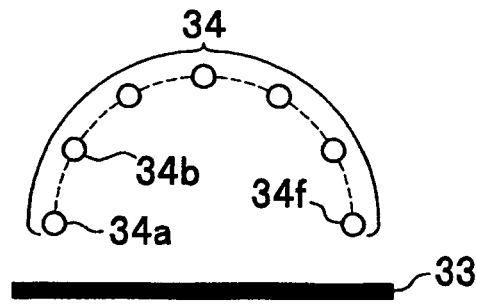
Figure 6D:
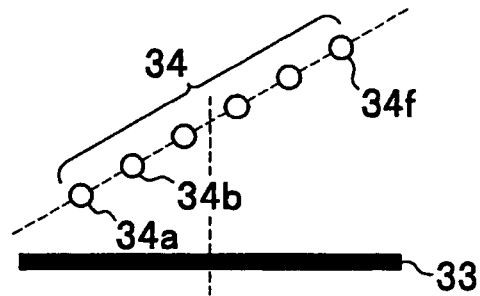
Figure 6E:
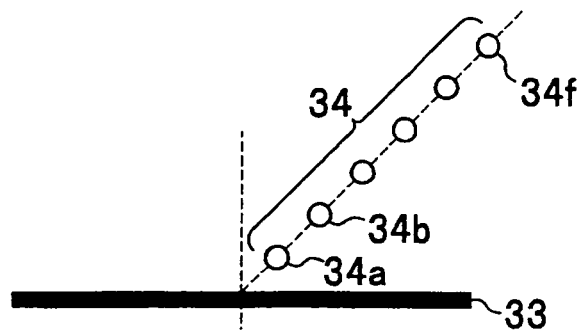

In a fourth variation, as shown in FIG. 6D, the conductive elements 34a, 34b, . . . , 34f constituting the auxiliary antenna 34 are disposed at a predetermined angle of inclination over the whole top surface of the radiating antenna 33. Further, in a fifth variation, as shown in FIG. 6E, the conductive elements 34a, 34b, . . . , 34f constituting the auxiliary antenna 34 are disposed at a predetermined angle of inclination over a half area of the top surface of the radiating antenna 33 defined by the middle portion. Other variations are not shown specifically, although the conductive elements 34a, 34b, . . . , 34f may be disposed into a dome over the radiating antenna. It is needless to say that the reading area in each variation reaches to the whole area over the conductive elements 34a, 34b, . . . , 34f.

As described above, there are a lot of arrangement variations of the conductive elements, although these arrangement variations can be selected in accordance with the situation where the antenna apparatus is used. For example, the variation shown in FIG. 6A is suitable for the following cases. That is, a case where a small radio frequency IC tag is used on the plane perpendicular to the antenna apparatus and a case where a small radio frequency IC tag is attached on an elongated article (test tube, blood-collecting tube and the like) that cannot be brought down on its side.

On the other hand, the variations shown in FIGS. 6B, 6D and 6E are suitable for the case where a radio frequency IC tag is attached to a planar article and the variation shown in FIG. 6C is suitable for the case where a radio frequency IC tag is attached to a curved article.

In the case of FIG. 6E, the conductive elements 34a, 34b, . . . , 34f are disposed in a one-sided part (in the right-sided part in FIG. 6E) of the radiating antenna 33. Accordingly, the antenna characteristic of a simple radiating antenna is obtained in the other-sided part (in the left-sided part in FIG. 6E) and reading of a radio frequency IC tag of the standard size can be made easy.

Structure of the radiating antenna and the like for realizing the arrangements of variations shown in FIGS. 6A to 6E is now described. The radiating antenna uses a patch antenna (having linear polarization characteristic) including a circular or rectangular radiating plane. The conductive elements are disposed to be parallel with the polarization plane of the radiating antenna.

More particularly, the conductive elements are made of aluminum having the width of 2.5 mm, the length of 50 mm and the thickness of 0.02 mm and are disposed on acrylic resin at intervals of 9 mm. The radiating antenna is formed on a printed board of Teflon (registered trademark) having the thickness of 1.6 mm. Such structure can realize the arrangements of variations shown in FIGS. 6A to 6E.

A substrate or basic material of the conductive elements is made of resin or paper of PVC, foaming PVC, PP, PET, Teflon resin, acrylic resin, ABS, PC, POM and the like or a lamination thereof. The conductive elements are formed on the substrate or in the substrate. When the substrate is a printed board, a glass epoxy substrate or a Teflon substrate can be used to make it easy. When the substrate is formed into a cylindrical shape, a flexible printed board using a polyimide substrate is suitable therefor.

The conductive elements may be mounted on an inner or outer wall or in a member of a housing of the antenna apparatus. Further, when the conductive elements are mounted on the outer wall of the housing, it is desirable that the conductive elements are protected by protection film made of resin or paper.

Fourth Embodiment

In the fourth embodiment of the present invention, an antenna apparatus including a radiating antenna constituted by a microstrip antenna and conductive elements disposed perpendicularly to the polarization plane of the radiating antenna is described.

Figure 7A:
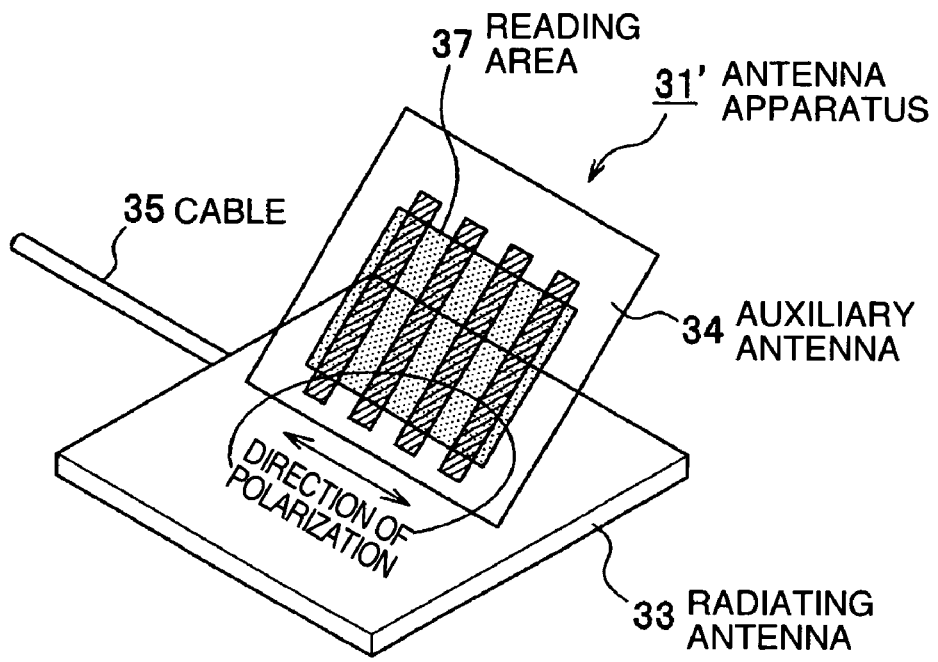
FIGS. 7A and 7B are diagrams illustrating antenna apparatuses including a radiating antenna constituted by a microstrip antenna and conductive elements disposed perpendicular to the plane of polarization of the radiating antenna.
Figure 7B:
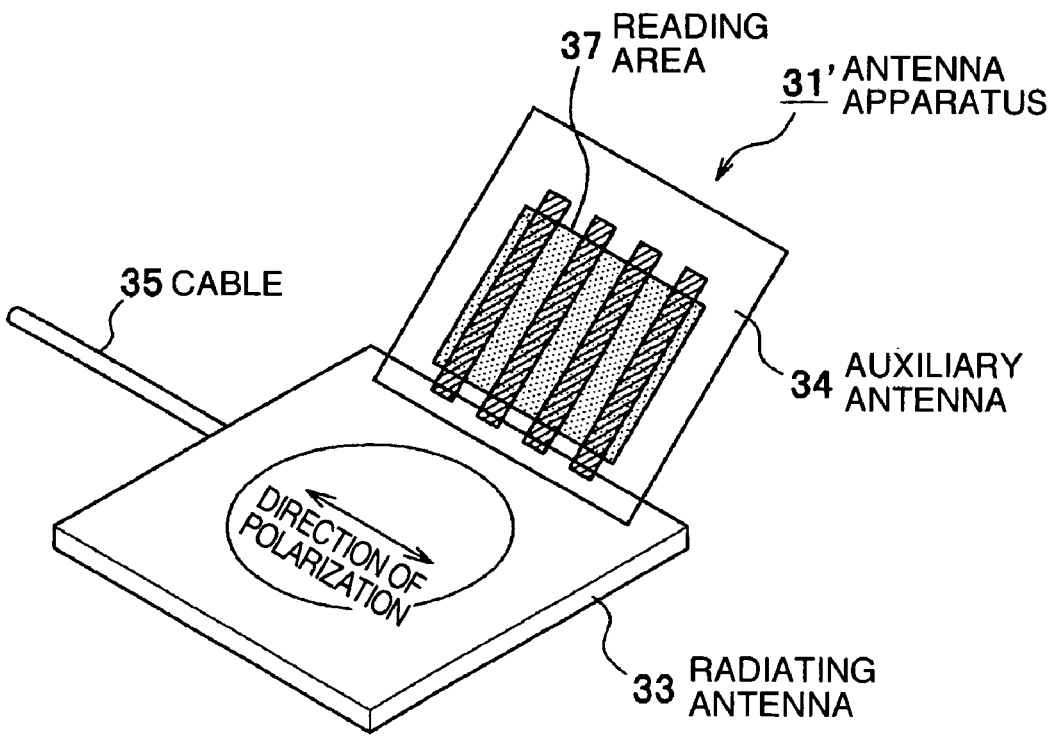

FIGS. 7A and 7B are diagrams illustrating structure of the antenna apparatuses including a radiating antenna constituted by a microstrip antenna and conductive elements disposed perpendicularly to the polarization plane of the radiating antenna. FIG. 7A illustrates the antenna apparatus including an auxiliary antenna 34 disposed over a half area of a top surface of the radiating antenna 33 defined by the middle portion and FIG. 7B illustrates the antenna apparatus including an auxiliary antenna 34 disposed along the outer periphery of the radiating antenna 33.

The antenna apparatus 31' shown in FIGS. 7A and 7B is different from the antenna apparatus 31 of FIG. 5 in that the conductive elements constituting the auxiliary antenna 34 are disposed perpendicularly to the direction of polarization of the radiating antenna 33 instead of being disposed in parallel with the direction of polarization of the radiating antenna 33. Even in this case, a variety of methods of arranging the plurality of conductive elements are considered.

More particularly, in a first variation, as shown in FIG. 8A, conductive elements 34a, 34b, . . . , 24f constituting the auxiliary antenna 34 are disposed on the plane perpendicular to the radiating antenna 33. Further, in a second variation, as shown in FIG. 8B, the conductive elements 34a, 34b, ..., 34f constituting the auxiliary antenna 34 are disposed on all the plane parallel with the radiating antenna 33. Moreover, in a third variation, as shown in FIG. 8C, the conductive elements 34a, 34b, ..., 34f constituting the auxiliary antenna 34 are disposed into a semicircle over all the top surface of the radiating antenna 33.

In a fourth variation, as shown in FIG. 8D, the conductive elements 34a, 34b, ..., 34f constituting the auxiliary antenna 34 are disposed at a predetermined angle of inclination over all the top surface of the radiating antenna 33. Further, in a fifth variation, as shown in FIG. 8E, the conductive elements 34a, 34b, ..., 34f constituting the auxiliary antenna 34 are disposed at a predetermined angle of inclination over a half area of the top surface of the radiating antenna 33 defined by the middle portion. Other variations are not shown specifically, although the conductive elements 34a, 34b, ..., 34f may be disposed into a dome over the top surface of the radiating antenna.

In the fourth embodiment, the conductive elements are disposed orthogonally to the radiating antenna. In this case, when a small radio frequency IC tag is read, the small radio frequency IC tag is set in parallel with the polarization plane of the radiating antenna and accordingly it is easy to read information recorded in the small radio frequency IC tag as compared with the antenna apparatus described in the third embodiment.

Accordingly, when the polarization plane of the small radio frequency IC tag is aligned or when the antenna apparatus is used in combination with an automatic conveying apparatus, it is possible to read information recorded in the small radio frequency IC tag more efficiently.

Fifth Embodiment

Figure 9:
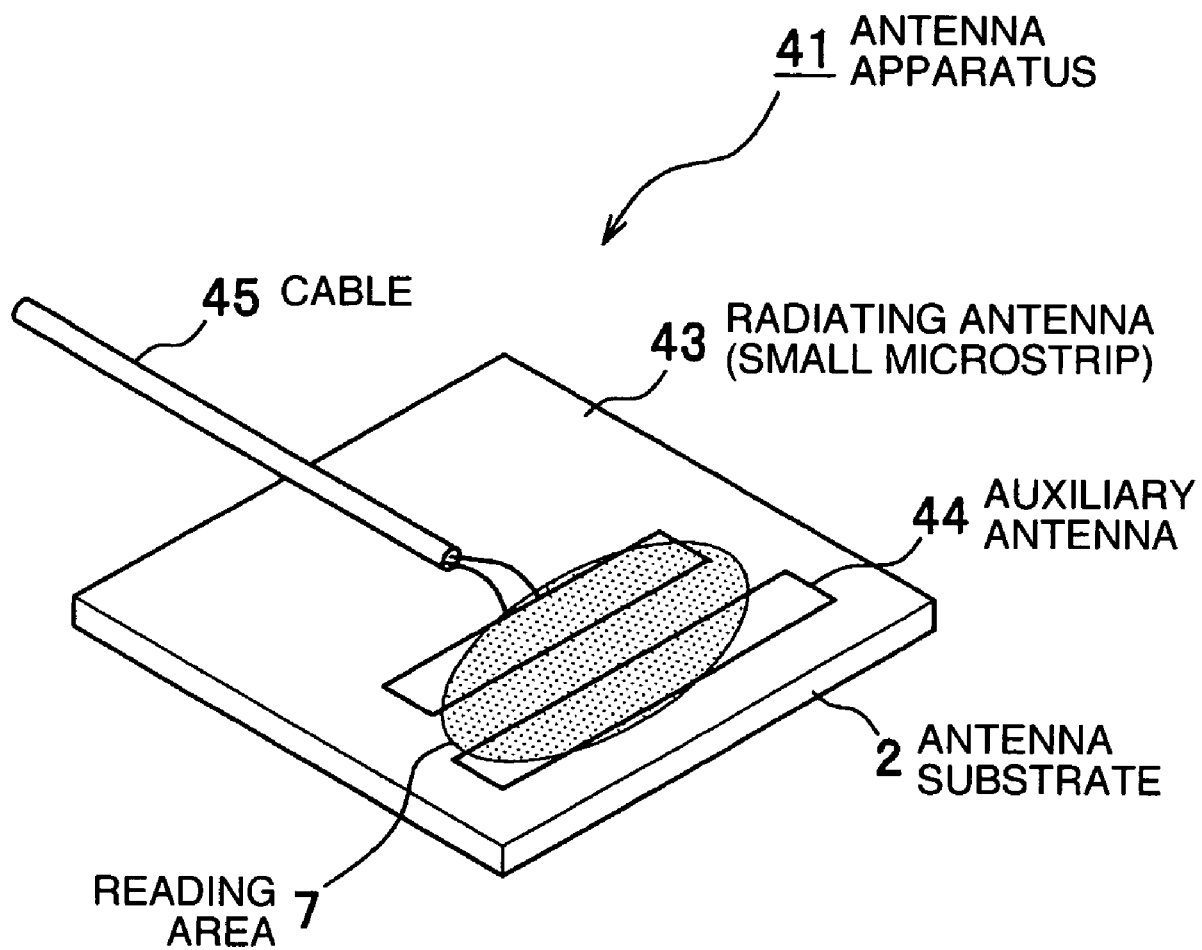
FIG. 9 is a diagram illustrating structure of an antenna apparatus according to a fifth embodiment of the present invention.

FIG. 9 is a diagram illustrating an antenna apparatus according to the fifth embodiment of the present invention.

The antenna apparatus 41 includes a radiating antenna 43 disposed in an antenna substrate 2 made of resin or ceramic as shown in FIG. 9. A radiating antenna 43 is constituted by a small microstrip antenna. An auxiliary antenna 44 is disposed in parallel with the polarization plane of the radiating antenna 43.

The fifth embodiment shown in FIG. 9 is different from the first embodiment shown in FIG. 1 in that the radiating antenna 43 is constituted by the small microstrip antenna instead of using the dipole antenna as the radiating antenna 1. The auxiliary antenna 44 can be constituted by a plurality of conductive elements in the same manner as the second embodiment. A variety of arrangements including the plurality of conductive elements are next described.

FIGS. 10A to 10D are diagrams illustrating a variety of arrangements of the conductive elements constituting the auxiliary antenna disposed in parallel with the polarization plane of the radiating antenna constituted by the small microstrip.

Figure 10A:
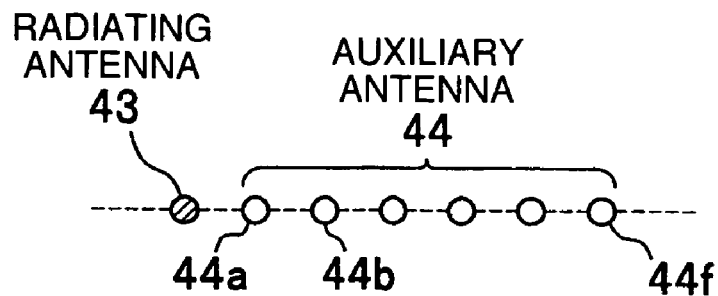
FIGS. 10A to 10D are diagrams illustrating a variety of arrangements of conductive elements constituting an auxiliary antenna disposed in parallel with the plane of polarization of the radiating antenna constituted by small microstrip.
Figure 10B:
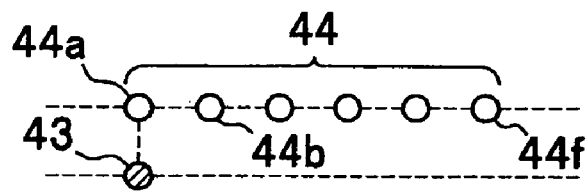
Figure 10C:
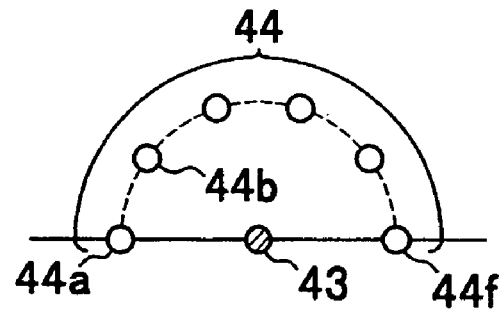
Figure 10D:
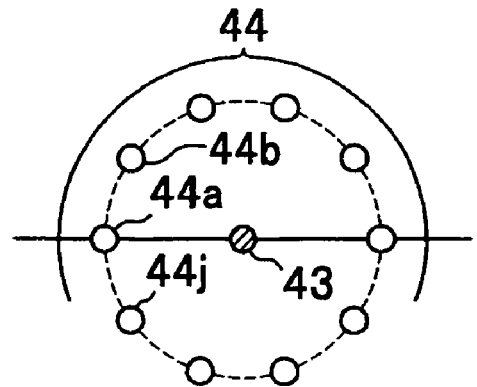

More particularly, in a first variation, as shown in FIG. 10A, the radiating antenna 43 and the conductive elements 44a, 44b, ..., 44f constituting the auxiliary antenna 44 are disposed on the same plane. Further, in a second variation, as shown in FIG. 10B, the conductive elements 44a, 44b, ..., 44f constituting the auxiliary antenna 44 are disposed above the radiating antenna 43. Moreover, in a third variation, as shown in FIG. 10C, the conductive elements 44a, 44b, ..., 44f constituting the auxiliary antenna 44 are disposed into a semi-circle about the radiating antenna 43. Further, in a fourth variation, as shown in FIG. 10D, the conductive elements 44a, 44b, ..., 44f constituting the auxiliary antenna 44 are disposed into a circle about the radiating antenna 43.

Figure 11A:
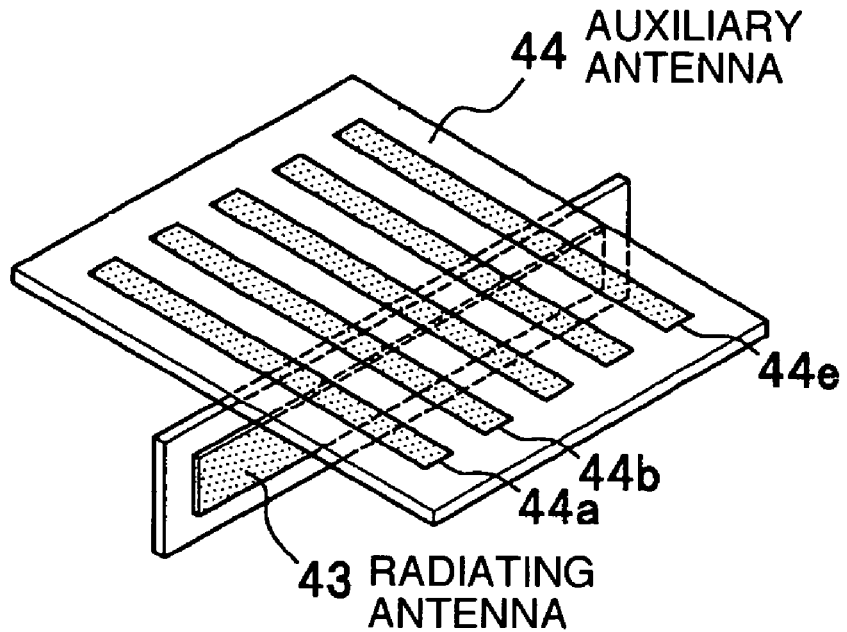
FIGS. 11A and 11B are diagrams illustrating an arrangement of conductive elements constituting an auxiliary antenna disposed perpendicularly to the plane of polarization of the radiating antenna constituted by small microstrip.
Figure 11B:
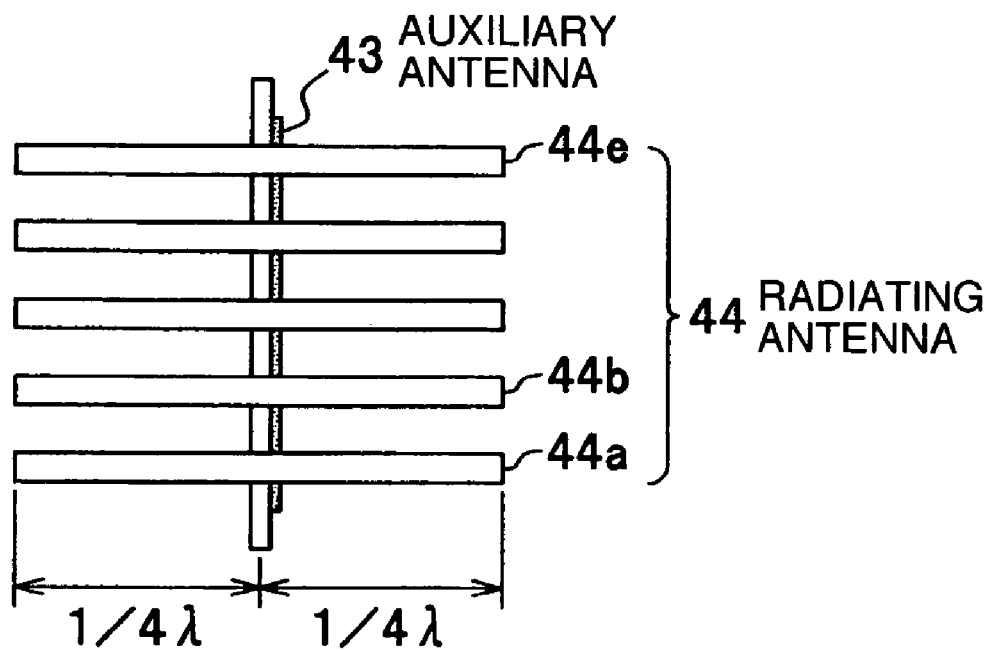

Next, description is made to a method of arranging conductive elements constituting the auxiliary antenna 44 disposed perpendicularly to the polarization plane of the radiating antenna 43 constituted by the small microstrip. As shown in a perspective view of FIG. 11A, when the auxiliary antenna 44 is disposed perpendicularly to the polarization plane of the radiating antenna 43, the radiating antenna 43 is disposed orthogonally to the auxiliary antenna 44 constituted by the conductive elements 44a, 44b, ..., 44e. That is, as shown in FIG. 11B, the conductive elements 44a, 44b, ..., 44e are disposed on a plane perpendicular to the radiating antenna 43 so that the conductive elements are sectioned by the radiating antenna 43 to have right and left parts each having the length of $\lambda/4$.

In the fifth embodiment, the radiating antenna 43 is formed on the substrate made of glass epoxy and includes the radiating plane having the length of 31 mm and the width of 5 mm. The conductive elements has the length of 50 mm and the width of 2.5 mm and five conductive elements are disposed at intervals of 9 mm. In such structure, when the user holds the small radio frequency IC tag over the auxiliary antenna 44, information recorded in the small radio frequency IC tag can be read easily without consciousness of the polarization plane of the antenna of the small radio frequency IC tag and the reader antenna. Further, even when the user uses a general radio frequency IC tag having a half-wave dipole antenna, information recorded in the general radio frequency IC tag can be read easily without consciousness of the polarization plane.

Sixth Embodiment

In the sixth embodiment, the layout of conductive elements is described.

Figure 12A:
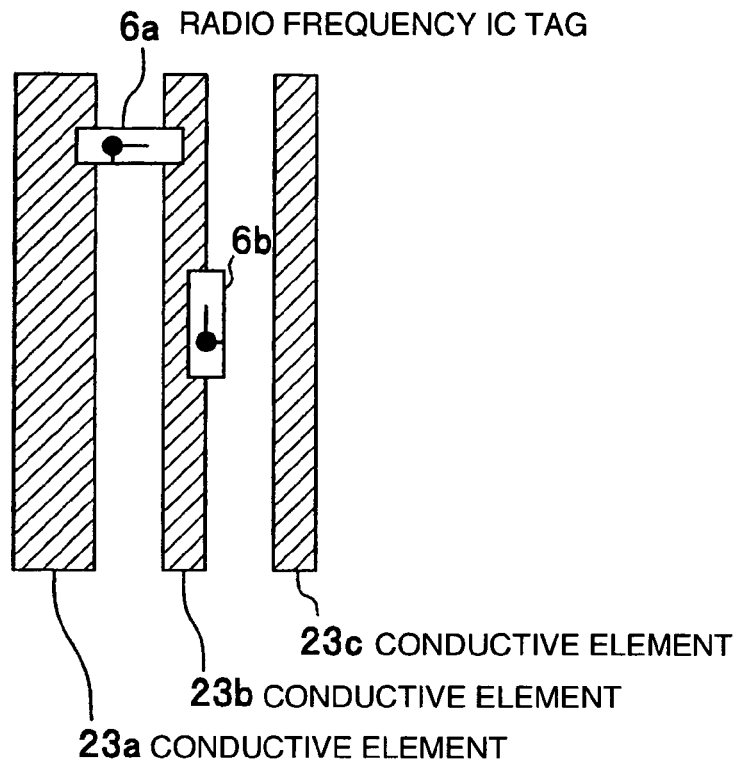
FIGS. 12A and 12B are diagrams showing positional relation of conductive elements and the radio frequency IC tag.
Figure 12B:
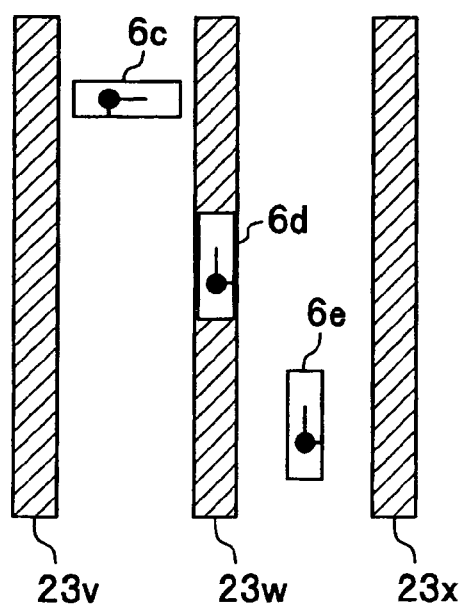

FIGS. 12A and 12B are diagrams showing the positional relation of conductive elements and radio frequency IC tag. FIG. 12A shows readable positional relation and FIG. 12B shows unreadable positional relation. As shown in FIG. 12A, when the radio frequency IC tag 6a and the conductive elements 23a and 23b overlap each other orthogonally or when the radio frequency IC tag 6b and the conductive element 23b are set in parallel with each other and partially overlap each other or when radio frequency IC tag 6b and the conductive element 23b approach each other while being parallel with or substantially parallel with each other, the mutually complementary tuning is made even between the conductive elements 23a, 23b and the inlet antenna of the radio frequency IC tag 6a or 6b as described above and accordingly the antenna apparatus can receive radio wave from the radio frequency IC tag 6a, 6b, so that a reader/writer can read information.

On the other hand, as shown in FIG. 12B, when the radio frequency IC tag 6c and the conductive elements 23v, 23w do not overlap each other even if both are at a right angle to each other or when the radio frequency IC tag 6e is parallel to the conductive elements 23w, 23x between the conductive elements 23w, 23x or when the radio frequency IC tag 6d overlaps the conductive element 23w in parallel with the conductive element 23w, the mutually complementary tuning cannot be made between the conductive elements 23v, 23w, 23x and the inlet antenna of the radio frequency IC tag 6c, 6d or 6e and accordingly the antenna apparatus cannot receive radio wave, so that the reader/writer cannot read information.

It is preferable from the foregoing that the space between the conductive elements is spread when the possibility that the conductive element and the radio frequency IC tag are orthogonal to each other is high and the space between the conductive elements is narrowed and the width of the conductive elements disposed inside is narrowed when the possibility that the conductive elements and the radio frequency IC tag are parallel with each other is high. That is, when the radio frequency IC tag and the conductive elements approach each other while overlapping each other, there is a tendency that error in reading occur and accordingly the width of the conductive elements is narrowed to thereby prevent occurrence of error.

Figure 13A:
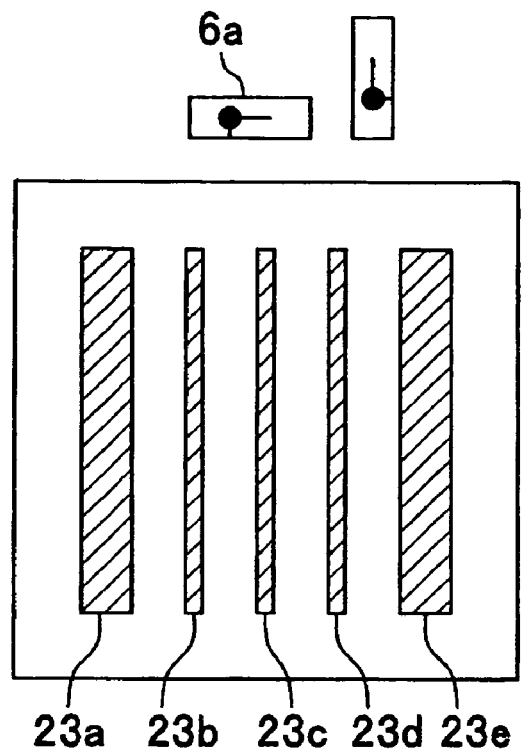
FIGS. 13A and 13B are diagrams showing desirable layouts of conductive elements.
Figure 13B:
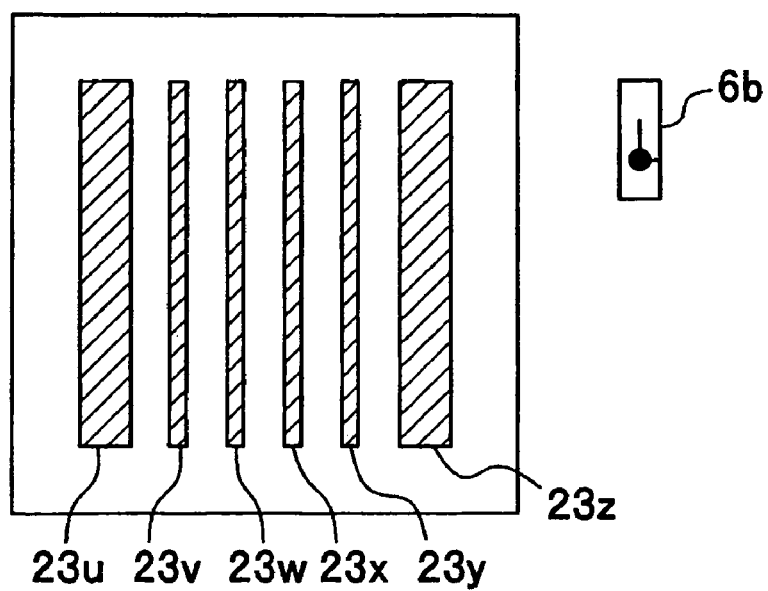

FIGS. 13A and 13B are diagrams showing desirable layouts of the conductive elements. FIG. 13A shows a layout in case where the possibility that the conductive elements and the radio frequency IC tag are orthogonal to each other is high and FIG. 13B shows a layout in case where the possibility that the conductive elements and the radio frequency IC tag are parallel with each other is high. When the possibility that the conductive elements and the radio frequency IC tag are orthogonal to each other is high, the width of the conductive elements 23a, 23e disposed at both ends is widened so that the conductive elements easily overlap the radio frequency IC tag 6a and the width of the conductive elements 23b, 23c, 23d disposed inside is narrowed and the spaces between the conductive elements 23a, 23b, 23c, 23d, 23e are widened to the degree that the radio frequency IC tag 6a overlaps the conductive elements when the radio frequency IC tag 6a is orthogonal to the conductive elements as shown in FIG. 13A.

Further, when the possibility that the conductive elements and the radio frequency IC tag are parallel with each other is high, the width of the conductive elements 23u, 23z disposed at both ends is widened so that the radio frequency IC tag 6b easily overlaps the conductive elements and the width of the conductive elements 23v, 23w, 23x, 23y disposed inside is narrowed and the spaces between the conductive elements 23u, 23v, 23w, 23x, 23y, 23z are narrowed to the degree that the radio frequency IC tag 6b overlaps the conductive elements when the radio frequency IC tag 6b is parallel with the conductive elements as shown in FIG. 13B.

In the sixth embodiment, the antenna apparatus can be fabricated in the form of FIG. 12B generally to thereby apply it to a small radio frequency IC tag having two polarization characteristics. For example, even when the antenna apparatus in which an array of conductive elements in the form of FIG. 12B is mounted reads information recorded in the small radio frequency IC tag 6b, the operator moves the small radio frequency IC tag toward the antenna apparatus in order to read the information in the small radio frequency IC tag while the operator moves the small radio frequency IC tag in the reading area over the antenna apparatus. The movement makes it possible to pass the small radio frequency IC tag through an optimum reading position. Accordingly, the antenna apparatus can read information in the small radio frequency IC tag without user's positioning for reading information in the small radio frequency IC tag.

Further, the array of conductive elements shown in FIGS. 13A and 13B can be used to thereby read information in the small radio frequency IC tag efficiently when the polarization plane of the small radio frequency IC tag is held in a predetermined direction while articles each having the small radio frequency IC tag attached thereto are automatically conveyed by an automatic conveying apparatus, for example.

Seventh Embodiment

In the seventh embodiment of the present invention, a variety of general arrangements of the radiating antenna and the conductive elements are described.

Figure 14A:
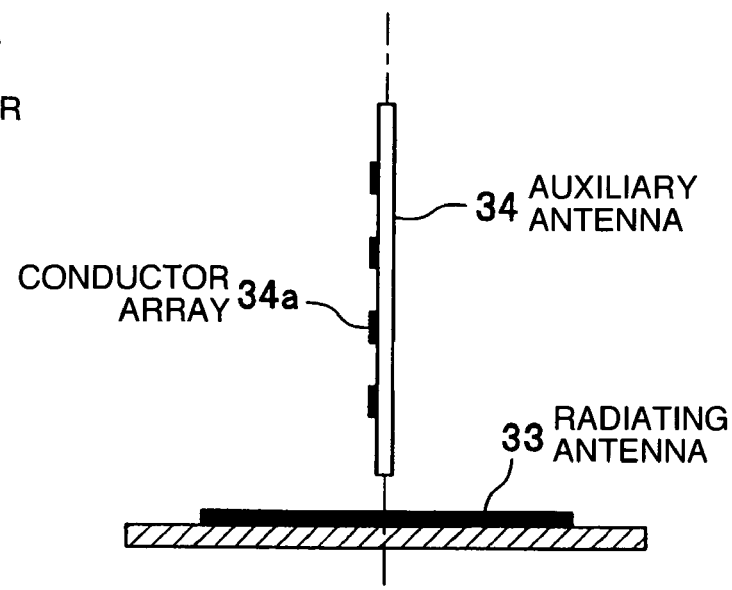
FIGS. 14A to 14C are diagrams illustrating a variety of general arrangements of the radiating antenna and the conductive elements.
Figure 14B:
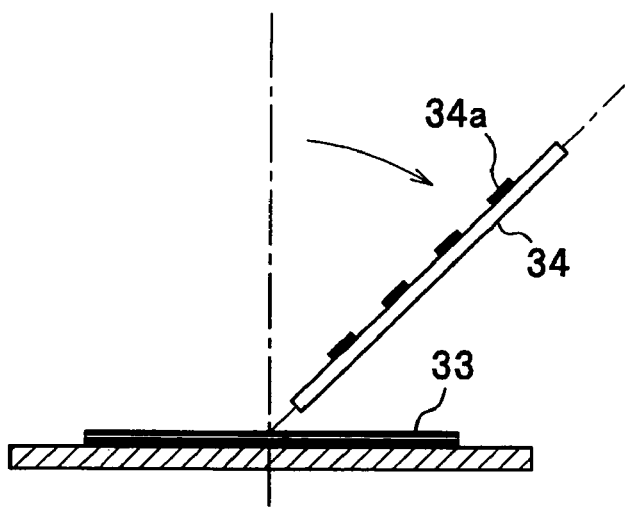
Figure 14C:
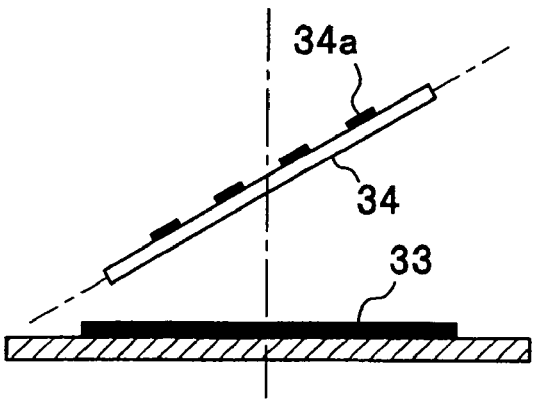

FIGS. 14A to 14C are diagrams illustrating a variety of general arrangements of the radiating antenna and the conductive elements.

In a first variation, as shown in FIG. 14A, the auxiliary antenna 34 is disposed on a plane perpendicular to the radiating antenna 33 (that is, on the radiation axis). The auxiliary antenna 34 is constituted by a conductor array (that is, an array of conductive elements) composed of a plurality of conductive elements. Further, in a second variation, as shown in FIG. 14B, the auxiliary antenna 34 constituted by the plurality of conductive elements 34a is disposed at a predetermined angle of inclination over a half area of the top surface of the radiating antenna 33 defined by the middle portion. In a third variation, as shown in FIG. 14C, the auxiliary antenna 34 constituted by the plurality of conductive elements 34a is disposed at a predetermined angle of inclination over whole area of the top surface of the radiating antenna 33.

Eighth Embodiment

In the eighth embodiment of the present invention, a variety of arrangements of the radiating antenna and the conductive elements are described. FIGS. 15A to 15K are diagrams illustrating a variety of arrangements of the radiating antenna and the conductive elements in the eighth embodiment.

Figure 15A:
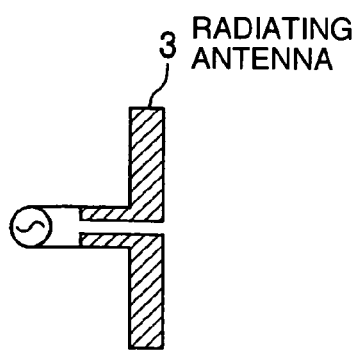
FIGS. 15A to 15K are diagrams illustrating a variety of arrangements of a radiating antenna and conductive elements according to an eighth embodiment of the present invention.
Figure 15B:
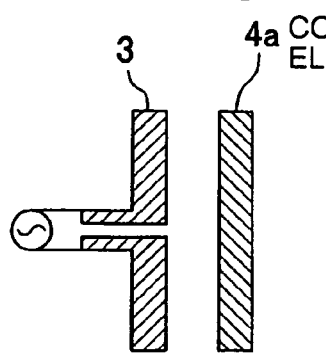
Figure 15C:
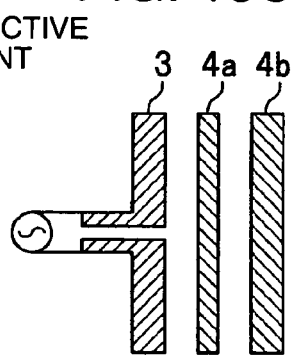
Figure 15D:
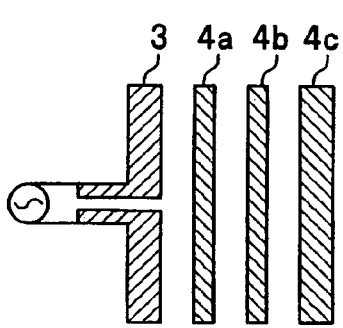

FIG. 15A illustrates a first variation of the antenna apparatus including only the radiating antenna 3 of a dipole type. FIG. 15B illustrates a second variation of the antenna apparatus including the radiating antenna 3 and only one conductive element 4a constituting the auxiliary antenna disposed opposite to the radiating antenna 3. FIG. 15C illustrates a third variation of the antenna apparatus including the radiating antenna 3 and two conductive elements 4a and 4b constituting the auxiliary antenna disposed opposite to the radiating antenna 3. In this case, the width of the conductive element 4b disposed at an end is slightly widened. FIG. 15D a fourth variation of the antenna apparatus including the radiating antenna 3 and three conductive elements 4a, 4b and 4c constituting the auxiliary antenna disposed opposite to the radiating antenna 3. In this case, the width of the conductive element 4c disposed at an end is slightly widened.

Figure 15E:
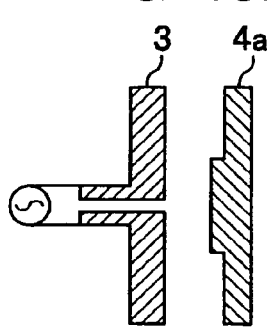
Figure 15F:
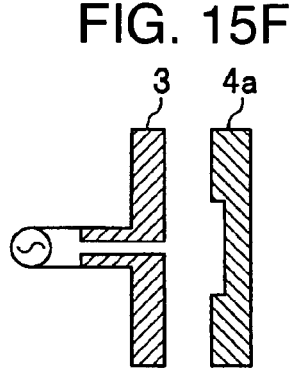
Figure 15G:
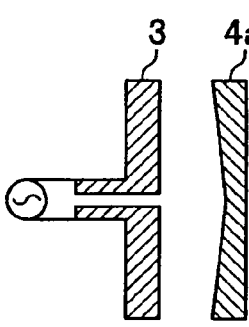

Further, FIG. 15E illustrates a fifth variation of the antenna apparatus including the radiating antenna 3 and one conductive element 4a constituting the auxiliary antenna and having a wide middle portion. FIG. 15F illustrates a sixth variation of the antenna apparatus including the radiating antenna 3 and one conductive element 4a constituting the auxiliary antenna and having both end portions widened. FIG. 15G illustrates a seventh variation of the antenna apparatus including the radiating antenna 3 and one conductive element 4a constituting the auxiliary antenna and having the width that is tapered from both end portions toward the middle portion.

Figure 15H:
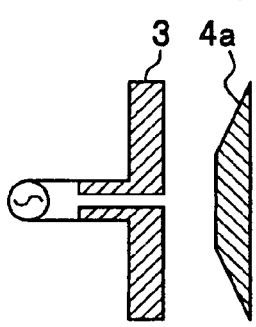
Figure 15I:
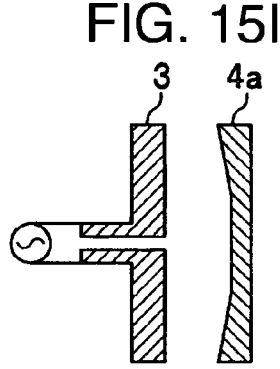
Figure 15J:
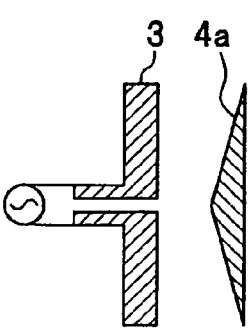
Figure 15K:
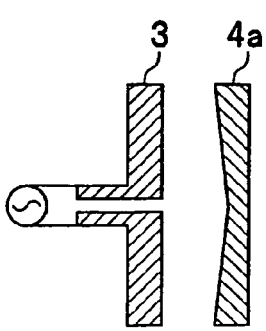

FIG. 15H illustrates an eighth variation of the antenna apparatus including the radiating antenna 3 and one conductive element 4a constituting the auxiliary antenna and having the width of which the middle portion is wide and which is tapered from the middle portion toward both end portions. FIG. 15I illustrates a ninth variation of the antenna apparatus including the radiating antenna 3 and one conductive element 4a constituting the auxiliary antenna and having the width of which the middle portion is narrow and which is gradually widened from the middle portion toward both end portions. FIG. 15J illustrates a tenth variation of the antenna apparatus including the radiating antenna 3 and one conductive element 4a constituting the auxiliary antenna and having the width which is tapered from the middle portion toward both end portions. FIG. 15K illustrates an eleventh variation of the antenna apparatus including the radiating antenna 3 and one conductive element 4a constituting the auxiliary antenna and having the width which is gradually widened from the middle portion toward both end portions.

In the eighth embodiment, when one conductive element is added to the radiating antenna, the conductive element 4a is formed into the shape as shown in FIG. 15G, so that the space at the middle portion between the radiating antenna and the conductive element is wider as compared with other portion and the space is gradually narrowed from the middle portion toward both end portions. In such structure, when the user causes the small radio frequency IC tag to approach the antenna apparatus, the antenna apparatus can read information recorded in the small radio frequency IC tag at the position fitted to the antenna length of the small radio frequency IC tag (position between the radiating antenna and the conductive element).

For example, when the small radio frequency IC tag mounted in a certain article is scanned by a handy reader including the antenna apparatus of the embodiment mounted therein, information recorded in the small radio frequency IC tag is read by the antenna apparatus when the antenna apparatus and the small radio frequency IC tag satisfy the positional relation suitable for reading of information on the basis of the relation of the space between the radiating antenna and the conductive element and the antenna length of the small radio frequency IC tag, so that the reading efficiency of information recorded in the small radio frequency IC tag is improved.

Further, even when the small radio frequency IC tags having the sizes different from each other are used, time and labor for optimizing the space between the radiating antenna and the conductive element are not required and accordingly the antenna apparatus can be utilized generally.

[Definite Example of Antenna Apparatus]

Definite examples of the antenna apparatus including the conductor array disposed in a linear polarization patch antenna are now described with reference to FIGS. 17 to 20.

Figure 17A:
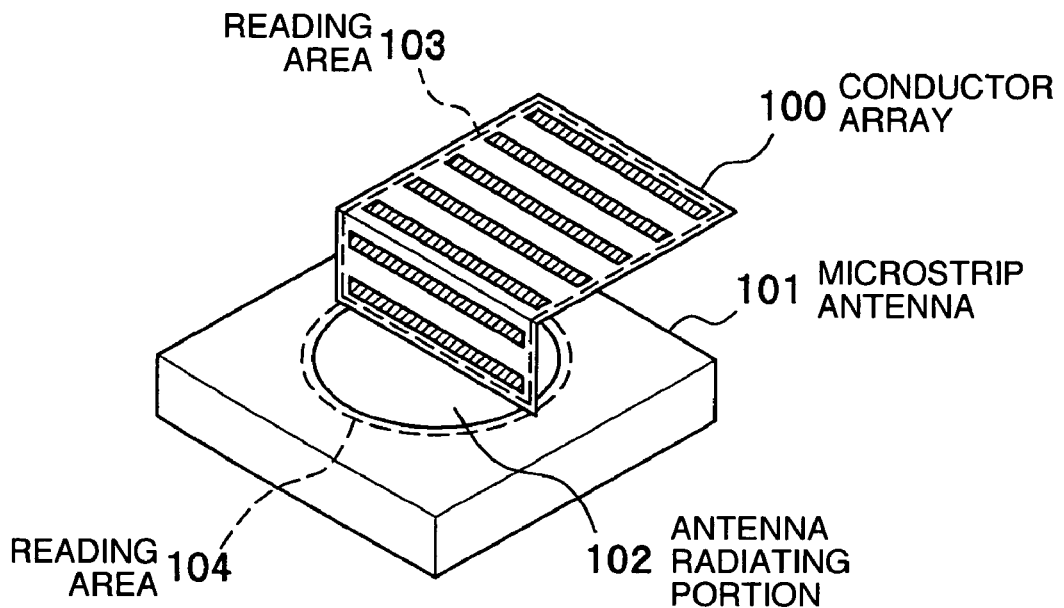
FIGS. 17A to 17C are diagrams illustrating a definite example of the inside of the antenna apparatus.
Figure 17B:
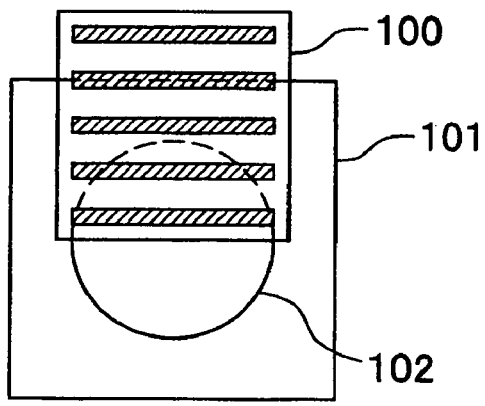
Figure 17C:
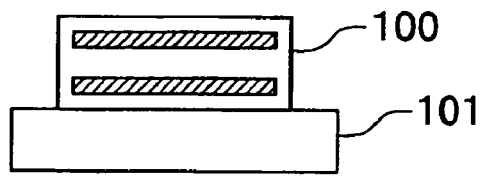

In FIGS. 17A to 17C, a conductor array 100 is disposed to have a half area of an antenna radiating portion 102 of a microstrip antenna (patch antenna) 101. In this case, the small radio frequency IC tag can be utilized in a reading area 103 corresponding to a reading portion of the radio frequency IC tag. Further, a general radio frequency IC tag can be utilized in a reading area 104 without reduction of a communication distance of the general radio frequency IC tag. Reading can be made in the polarization plane in the direction orthogonal to the polarization plane of the patch antenna in the reading area 103. Furthermore, the user can use the radio frequency IC tag without consciousness of the polarization plane if the reading distance is near.

Figure 18A:
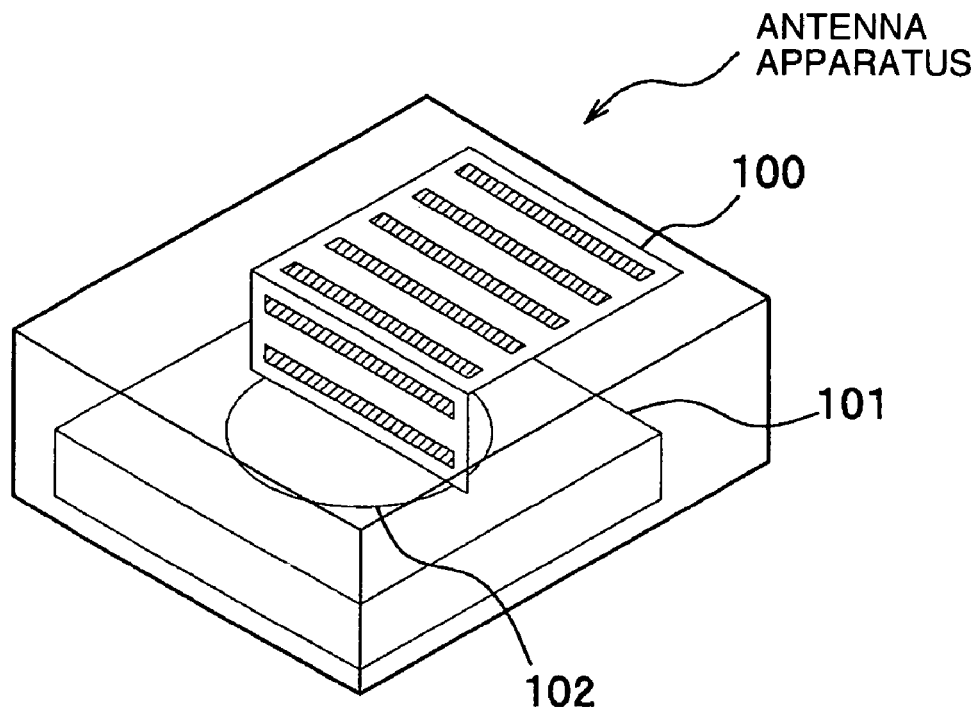
FIGS. 18A and 18B are diagrams illustrating an external appearance and a reading area of the antenna apparatus shown in FIGS. 17A to 17C.
Figure 18B:
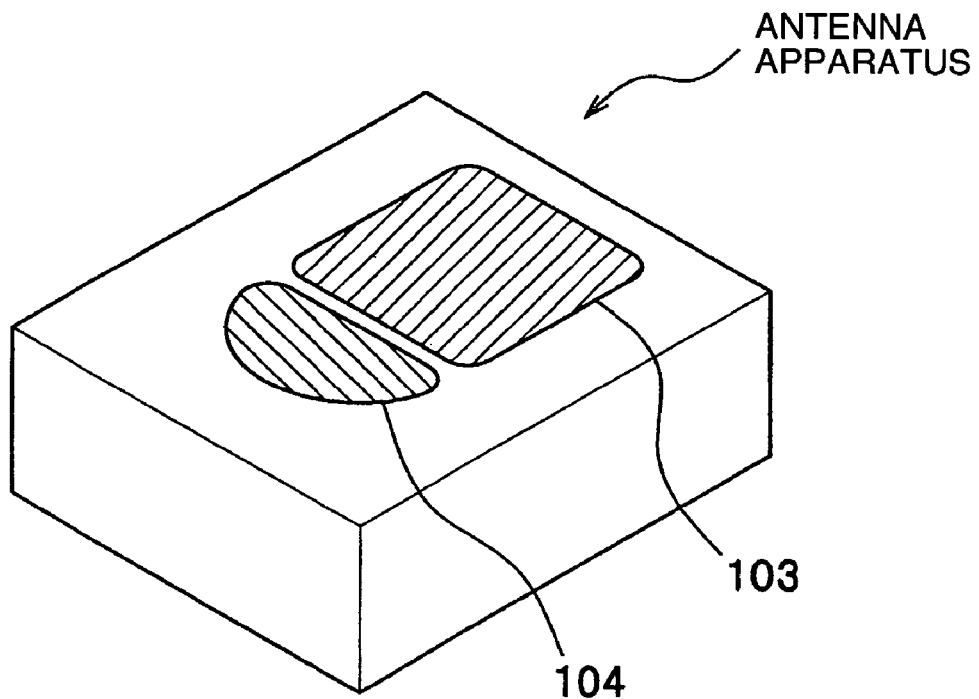

An external appearance of the antenna apparatus is as shown in FIG. 18A and the following characteristics can be obtained in the reading areas 103 and 104 shown in FIG. 18B. Even when any of the small radio frequency IC tag and the general radio frequency IC tag is used in the reading area 103, there is no dependence on the polarization plane. However, in case of the general radio frequency IC tag, the communication distance is made short.

On the other hand, when the general radio frequency IC tag is used in the reading area 104, information is apt to be read in the polarization plane of the microstrip antenna 101.

Figure 19A:
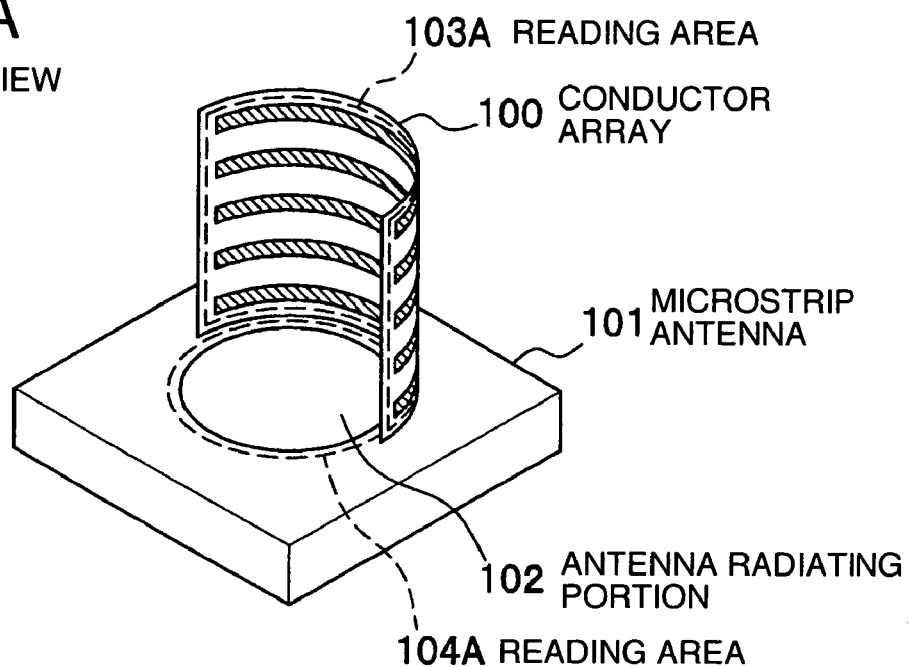
FIGS. 19A to 19C are diagram illustrating another definite example of the inside of the antenna apparatus.
Figure 19B:
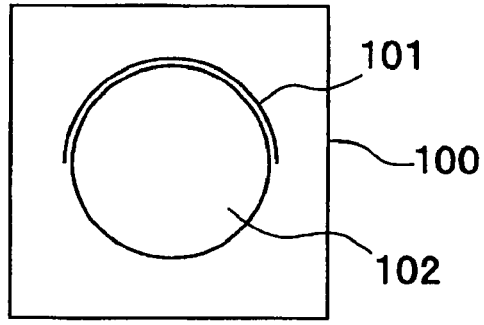
Figure 19C:
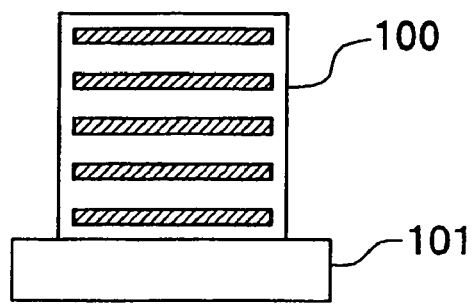

In FIGS. 19A to 19C, a conductor array 100 is formed into a semicylinder and disposed on the antenna radiating portion 102 of the microstrip antenna 101. In this case, the small radio frequency IC tag can be utilized in the reading area 103A corresponding to the reading portion of the radio frequency IC tag. Further, the general radio frequency IC tag can be utilized in the reading area 104A without reduction of the communication distance with the general radio frequency IC tag. The antenna apparatus can be used generally instead of being used as a dedicated apparatus for the small radio frequency IC tag. The conductor array 100 may be mounted on an inner or outer wall or in a member of a housing not shown.

Figure 20A:
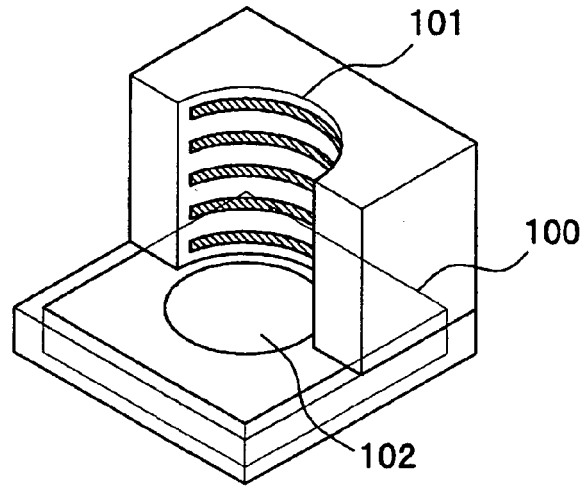
FIGS. 20A to 20C are diagrams illustrating an external appearance and a reading area of the antenna apparatus shown in FIGS. 19A to 19B.
Figure 20B:
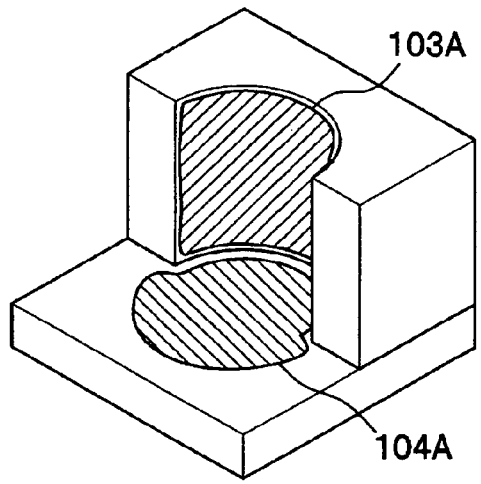
Figure 20C:
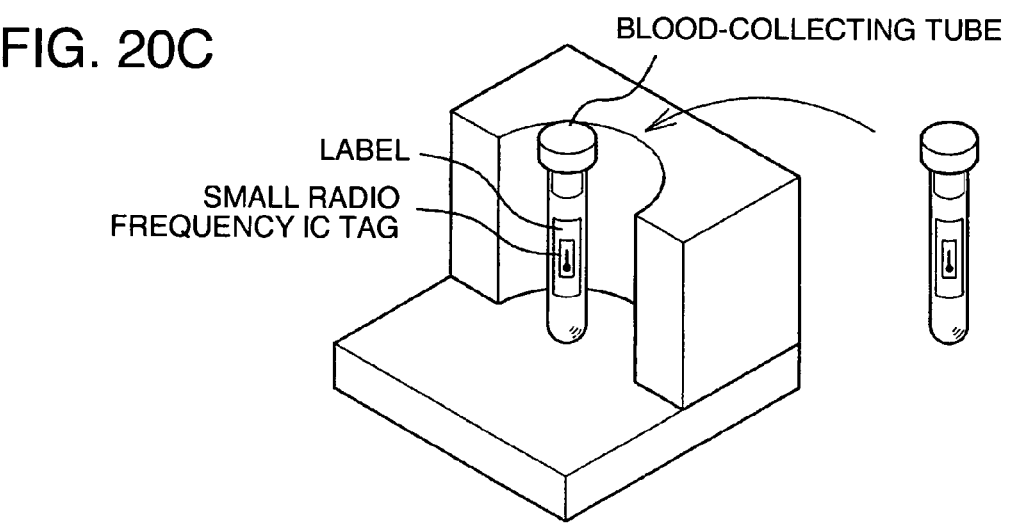

FIG. 20A shows an external appearance of the antenna apparatus of FIG. 19, FIG. 20B shows two reading areas 103A and 104A and FIG. 20C shows an application example of the antenna apparatus used in a blood test system. In the application example shown in FIG. 20C, when the user causes a blood-collecting tube to which a small radio frequency IC tag having the length of 10 mm and the width of 1.5 mm is attached to approach a depression of the antenna apparatus, information (for example, reason for collection of blood) recorded in the small radio frequency IC tag is read by the antenna apparatus.

Figure 21:
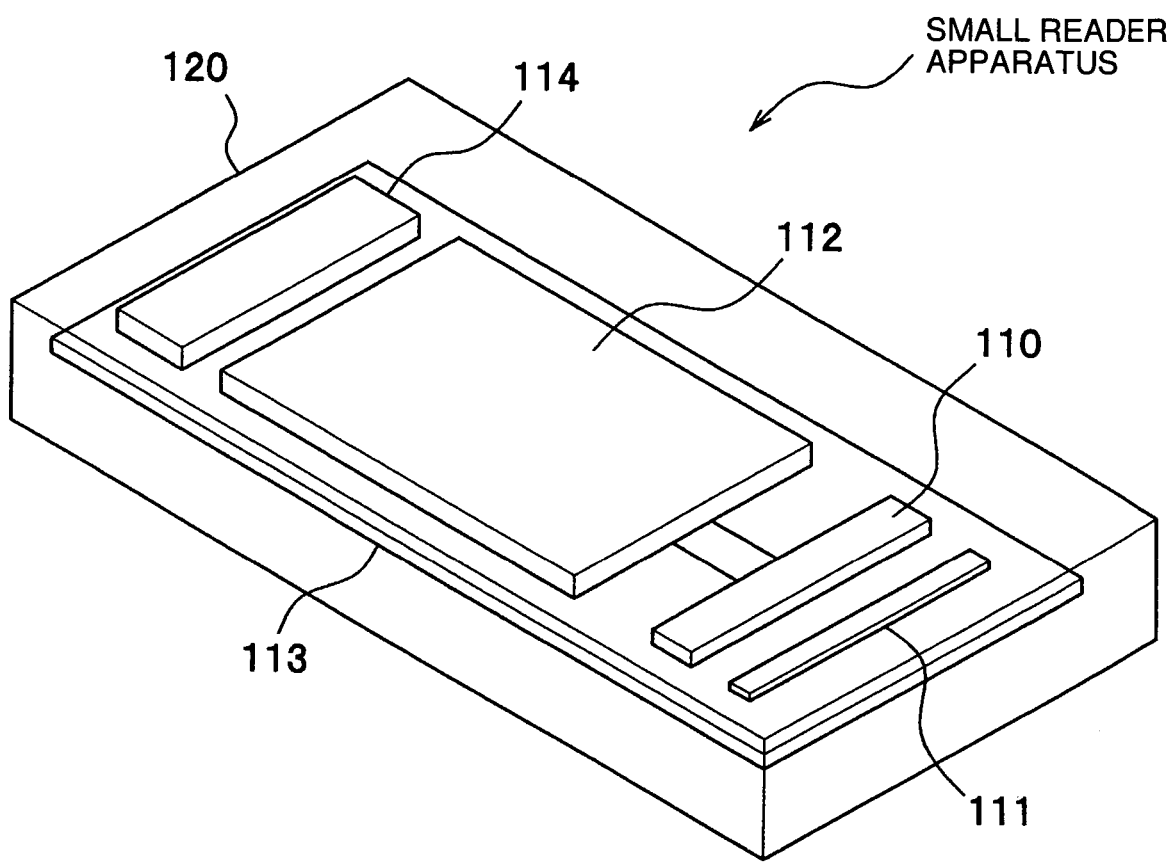
FIG. 21 is a diagram illustrating a mounting example of the antenna apparatus of the present invention.
Figure 22A:
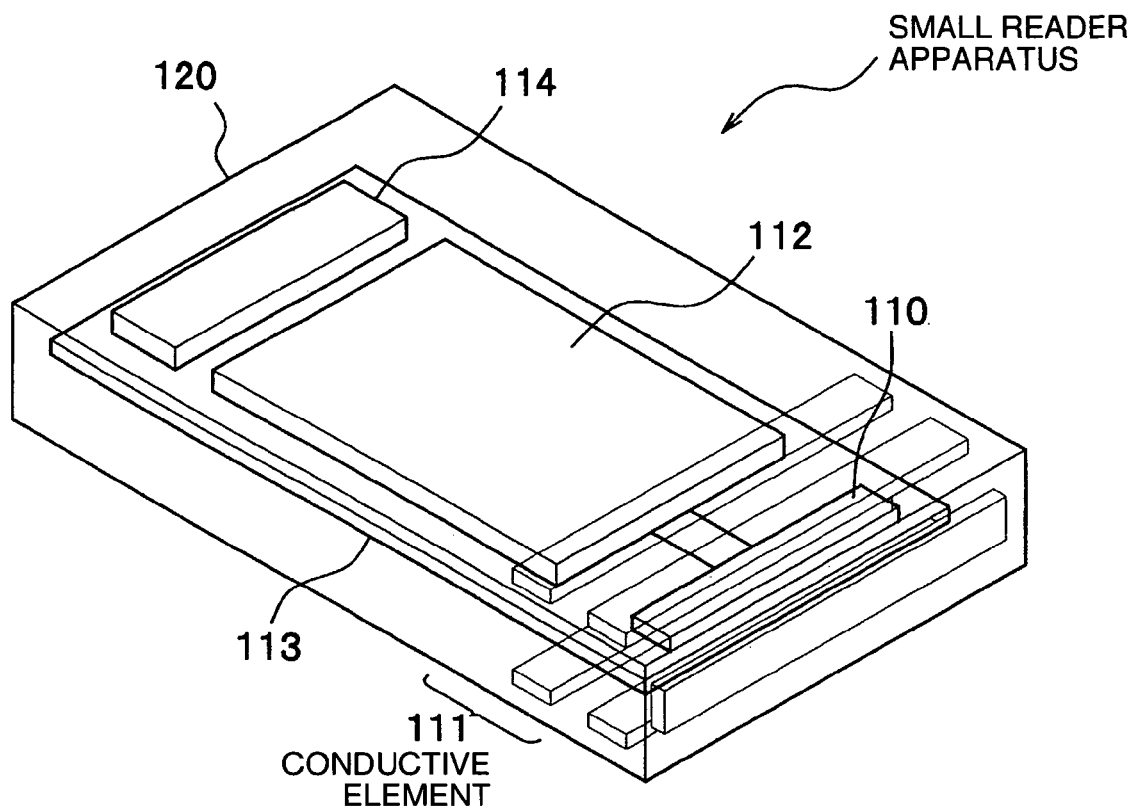
FIGS. 22A and 22B are diagram illustrating another embodiment of an antenna apparatus of the present invention.
Figure 22B:
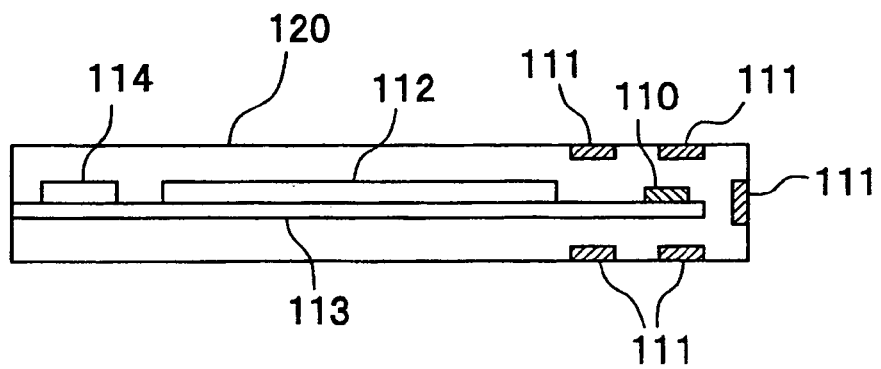

Referring now to FIG. 21 and FIGS. 22A and 22B, embodiment examples of the antenna apparatus are described.

First, the antenna apparatus shown in FIG. 21 includes a radiating antenna 110, a conductive element 111 and a reader circuit 112 of a radio frequency IC tag mounted on the same reader circuit board 113. An interface circuit 114 for a personal computer (PC) is also mounted on the reader circuit board 113. Such structure miniaturizes the antenna apparatus.

The antenna apparatus shown in FIGS. 22A and 22B includes conductive elements 111 mounted on an inner wall of a housing 120 of an existing small reader apparatus. Such structure can mount the conductive elements 111 without re-manufacturing the housing of the existing small reader apparatus. Further, information recorded in the small radio frequency IC tag can be read in the periphery of upper and lower sides of the small reader apparatus and in the periphery of the conductive elements 111 at an end of the housing, so that operability in reading is improved.

In FIGS. 22A and 22B, the conductive elements 111 are mounted on the inner wall of the housing of the antenna apparatus, although the conductive elements 111 may be mounted on the outer wall or in a member of the housing 120 as far as a burden on operation such as re-manufacturing of the housing 120 is reduced.

SUMMARY

As described above, according to the antenna apparatus shown in the embodiments, even when the antenna apparatus reads information recorded in the radio frequency IC tag including an inlet antenna of 15 mm or less, the polarization plane of the radiating antenna disappears and the information can be read from any direction and accordingly the reading operability of information recorded in the radio frequency IC tag is more improved. Moreover, since the antenna apparatus does not consume electric power, even the reader/writer having low radio output power can exhibit the antenna function sufficiently. For example, even the radio output apparatus having an average transmission output of 80 mW corresponding to the personal handy-phone system (PHS) can exhibit the antenna function sufficiently. Accordingly, even when information recorded in the radio frequency IC tag is read in the place (for example, medical facilities or the like) where it is necessary to be conscious of the radio protection policy, the antenna apparatus of the present invention can be used to collect information recorded in the radio frequency IC tag.

Since the antenna apparatus shown in the embodiments can be used in the reader/writer to thereby read information recorded in the radio frequency IC tag attached to a small bottle (for example, ampul or the like) for medicine easily, the antenna apparatus can be utilized in inspection in a manufacturing line or product management of medicine or medicine management in a hospital. Further, since information of medicine in a PTP package can be read with no polarization, the antenna apparatus can be utilized in inspection in a manufacturing line or product management of medicine or medicine management in a hospital. Furthermore, the antenna apparatus can utilized in inspection in a manufacturing line, product management or waste management of syringes or syringe management in a hospital. In addition, the antenna apparatus can be utilized in inspection in a manufacturing line, product management or inspection process of inspection tubes used in the blood test or management thereof in a hospital.

Further, by using the antenna apparatus according to the present invention in the reader/writer, information recorded in the radio frequency IC tags inserted in or attached to papers such as tickets, gift certificates and clinical record sheets can be read. By attaching the radio frequency IC tags to papers at any places thereof at random, piled papers are not swelled due to the radio frequency IC tags and accordingly it is easy to treat the tickets, gift certificates, clinical record sheets and the like. Further, when the radio frequency IC tag is attached to a card, miniaturization of the radio frequency IC tag reduces the probability that the area of the radio frequency IC tag is taken with fingers when the reader/writer approaches the card, so that there is no possibility that the communication distance becomes unsteady and accordingly the reading efficiency of information recorded in the radio frequency IC tag is more improved.

In addition, by using the antenna apparatus according to the present invention in the reader/writer, since information recorded in the radio frequency IC tag can be read even when the radio frequency IC tag is attached to a foodstuff, the antenna apparatus can be widely utilized in the food industry. Generally, in case of a radio frequency IC tag for the band of 2.45 GHz, when metal or moisture exists in the vicinity of the radio frequency IC tag, the distance that information recorded in the radio frequency IC tag can be read is known to be reduced. In the antenna apparatus according to the present invention, however, since the auxiliary antenna is combined with the inlet antenna of the radio frequency IC tag to form the subsidiary tuning circuit, the distance that information recorded in the radio frequency IC tag can be read can be lengthened. The reason thereof is that it is adapted to prevent that the distance that information recorded in the radio frequency IC tag can be read is reduced due to influence by moisture contained in metal and foodstuff.

Further, even when the general radio frequency IC tag, for example, the radio frequency IC tag having an IC chip mounted in a dipole antenna of $1/2\lambda$ type is directly attached to metal, the attribute information of the metal recorded in the radio frequency IC tag can be read and accordingly the antenna apparatus can be utilized in product management or characteristic management of metal products. Furthermore, the antenna apparatus can be utilized in management of plastic bottles, refreshing drink or the like and management of cards, clinical record sheets, medication, injection, inspection or diagnostic apparatuses in a hospital.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An antenna apparatus for making communication with a radio frequency IC tag to read information stored in an integrated circuit chip included in the radio frequency IC tag and serving as a reader/writer, comprising:
    a radiating antenna which generates an electric field by electric power supplied to a feeding point thereof; and
    an auxiliary antenna which resonates by the electric field generated by the radiating antenna to generate an induced current;
    the radiating antenna and the auxiliary antenna having the same length,
    the auxiliary antenna comprising a plurality of conductive elements arranged in an array, each conductive element having the same length as that of said radiating antenna, and
    the plurality of conductive elements being disposed on the same plane and parallel to each other.

2. An antenna apparatus according to claim 1, wherein the length of the radiating antenna and the length of the auxiliary antenna is $\lambda/2$, respectively where $\lambda$ is a wavelength of radio wave used when the antenna apparatus communicates with the radio frequency IC tag.

3. An antenna apparatus according to claim 1, wherein the radiating antenna and the plurality of conductive elements are arranged at spaces shorter than or equal to the width or the length of the radio frequency IC tag.

4. An antenna apparatus according to claim 1, wherein the plurality of conductive elements are arranged at spaces of $0.01\lambda$ to $0.20\lambda$.

5. An antenna apparatus according to claim 4, wherein the plurality of conductive elements are arranged on a radiation axis of the radiating antenna.

6. An antenna apparatus according to claim 4, wherein the plurality of conductive elements are arranged at a predetermined angle of inclination on a radiation axis of the radiating antenna.

7. An antenna apparatus according to claim 4, wherein the width of conductive elements disposed at ends, of the plurality of conductive elements is wider than that of the other conductive elements.

8. An antenna apparatus according to claim 7, wherein width of the other conductive elements is 1 to 3 mm.

9. An antenna apparatus according to claim 7, wherein the conductive elements are directly arranged in an antenna substrate made of resin.

10. An antenna apparatus according to claim 9, wherein the plurality of conductive elements are arranged in parallel with a direction of polarization of the radiating antenna.

11. An antenna apparatus according to claim 9, wherein the plurality of conductive elements are arranged in perpendicular to a direction of polarization of the radiating antenna.

12. An antenna apparatus according to claim 1, wherein the radiating antenna and the plurality of conductive elements are arranged on the same plane.

13. An antenna apparatus according to claim 1, wherein the plurality of conductive elements are arranged above a top surface of the radiating antenna.

14. An antenna apparatus according to claim 1, wherein the radiating antenna, at least one conductive element of the auxiliary antenna and a reader circuit of the radio frequency IC tag are all formed on the same substrate.

15. An antenna apparatus according to claim 14, wherein a plurality of conductive elements of the auxiliary antenna are mounted on at least one of an inner wall of a housing of the antenna apparatus, an outer wall of the housing of the antenna apparatus and a member of the housing of the antenna apparatus.

16. An antenna apparatus for making communication with a radio frequency IC tag to read information stored in an integrated circuit chip included in the radio frequency IC tag and serving as a reader/writer, comprising:
  a radiating antenna which generates an electric field by electric power supplied to a feeding point thereof; and
  an auxiliary antenna which resonates by the electric field generated by the radiating antenna to generate an induced current;
  wherein:
    the radiating antenna and the auxiliary antenna have the same length,
    the auxiliary antenna comprises a plurality of conductive elements arranged in an array, each conductive element having the same length as that of said radiating antenna,
    the plurality of conductive elements are disposed on the same plane and parallel to each other, and
    the plane of the conductive elements is above the radiating antenna.

17. An antenna apparatus according to claim 16, wherein the length of the radiating antenna and the length of the auxiliary antenna is $\lambda/2$, respectively where $\lambda$ is a wavelength of radio wave used when the antenna apparatus communicates with the radio frequency IC tag.

18. An antenna apparatus according to claim 16, wherein the radiating antenna and the plurality of conductive elements are arranged at spaces shorter than or equal to the width or the length of the radio frequency IC tag.

19. An antenna apparatus according to claim 16, wherein the plurality of conductive elements are arranged at spaces of $0.01\lambda$ to $0.20\lambda$.

20. An antenna apparatus according to claim 19, wherein the plurality of conductive elements are arranged at a predetermined angle of inclination on a radiation axis of the radiating antenna.

21. An antenna apparatus according to claim 19, wherein the width of conductive elements disposed at ends, of the plurality of conductive elements is wider than that of the other conductive elements.

22. An antenna apparatus according to claim 21, wherein width of the other conductive elements is 1 to 3 mm.

23. An antenna apparatus according to claim 21, wherein the conductive elements are directly arranged in an antenna substrate made of resin.

24. An antenna apparatus according to claim 23, wherein the plurality of conductive elements are arranged in parallel with a direction of polarization of the radiating antenna.

25. An antenna apparatus according to claim 23, wherein the plurality of conductive elements are arranged in perpendicular to a direction of polarization of the radiating antenna.

26. An antenna apparatus according to claim 23, wherein the radiating antenna, at least one conductive element of the auxiliary antenna and a reader circuit of the radio frequency IC tag are all formed on the same substrate.

27. An antenna apparatus according to claim 26, wherein a plurality of conductive elements of the auxiliary antenna are mounted on at least one of an inner wall of a housing of the antenna apparatus, an outer wall of the housing of the antenna apparatus and a member of the housing of the antenna apparatus.

* * * * *